United States Patent
Suzuki et al.

(10) Patent No.: US 6,970,263 B2
(45) Date of Patent: Nov. 29, 2005

(54) PRINT SYSTEM, PRINTING METHOD, AND SERVER

(75) Inventors: Haruhisa Suzuki, Kanagawa (JP); Toru Kimura, Kanagawa (JP); Masahiko Takaku, Kanagawa (JP); Eiichi Takagi, Kanagawa (JP); Shinji Fukunaga, Kanagawa (JP); Tsutomu Inose, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 09/893,647

(22) Filed: Jun. 29, 2001

(65) Prior Publication Data

US 2002/0016836 A1    Feb. 7, 2002

(30) Foreign Application Priority Data

| Jun. 30, 2000 | (JP) | ............................ 2000-199926 |
| Jun. 30, 2000 | (JP) | ............................ 2000-199928 |
| Jun. 30, 2000 | (JP) | ............................ 2000-199930 |
| Jun. 30, 2000 | (JP) | ............................ 2000-199931 |

(51) Int. Cl.⁷ .......................................... H04N 1/40
(52) U.S. Cl. .................................... 358/1.15; 358/468
(58) Field of Search ...................... 358/766, 1.15–1.18, 358/1.9, 468, 434–437; 395/101, 112–116; 709/104, 105, 203, 223

(56) References Cited

U.S. PATENT DOCUMENTS

| 6,115,132 A  * | 9/2000 | Nakatsuma et al. ........ 358/1.14 |
| 6,184,996 B1 * | 2/2001 | Gase .......................... 358/1.15 |
| 6,369,907 B1 * | 4/2002 | Aoki .......................... 358/1.15 |
| 6,798,530 B1 * | 9/2004 | Buckley et al. ............. 358/1.13 |

OTHER PUBLICATIONS

U.S. Appl. No. 09/363,826 filed Jul. 30, 1999.

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

There is provided a print system in which a print instruction is received from an information appliance (IA), a print request is issued to a server in response to the print instruction from the IA, and print data formed by the server is received in accordance with the print request, thereby enabling the print data to be printed from the IA.

2 Claims, 17 Drawing Sheets

PRINT SYSTEM, PRINTING METHOD, AND SERVER

BACKGROUND OF THE INVENTION

1. Field of the Invention

The invention relates to a print system, a printing method, a printer, a terminal apparatus, and a server for performing a service to output data for printing such as contents, document, or the like to a printer on the basis of position information such as a URL or the like of data such as contents, document, or the like on an information appliance such as cellular phone, PDA, or the like.

2. Related Background Art

Hitherto, to obtain a printed matter from an information appliance (hereinafter, simply referred to as an IA), data such as contents, document, or the like held or displayed in/onto the IA is directly outputted from the IA to a printer.

In the above conventional print system, however, only the data which is obtained by a small screen on the IA and by a memory of a small capacity thereof can be printed. Similarly, as for a printer driver or the like for controlling the printer, since the printer driver with an advanced function cannot be installed, a print output of high quality cannot be obtained.

Further, if the data such as contents, document, or the like to be printed is not held on the IA, there is a case where a necessity of downloading data of a large capacity for printing from a server on a network occurs. There are, consequently, problems such that a burden of a charge for the line is very large, a communicating time becomes long, an electric power consumption of the IA increases, and the like.

If there are the problems on printing from the IA as mentioned above, the troublesome operations such that the worker stores the position information such as a URL or the like of the data to be printed, the data is obtained again into a PC or the like which can be used by the printer and printed, and the like are necessary.

To solve the above problems, in the present invention, the applicant of the invention has proposed a print system such that in order to print data such as contents, document, or the like on the Internet which is obtained by the IA, a print instruction is sent from the IA to the printer, and the printer requests the server to issue the print instruction of the data, receives the data converted into the printing data from the server, and outputs it. According to such a print system, however, it is necessary that the printer is in a state where it is connectable to the Internet.

Since there is a limitation on use such that the printer needs to be in a state where it is connectable to the Internet as mentioned above, if the connection from the printer to the Internet is impossible due to some reasons, a print output cannot be obtained. The print output cannot be obtained either also in the case where the user does not want an administrator of the printer to be burdened with a charge for a connection line to the Internet from the printer.

Further, in the present invention, in case of the above-proposed print system, since the server which accepts a print instructing request from the printer is ordinarily a server which holds contents information, the server holding the contents information needs to have converting means for converting the contents information into the printing data. Therefore, if the server holding the contents information does not have the converting means for converting the contents information into the printing data, the contents information cannot be converted into the printing data.

SUMMARY OF THE INVENTION

It is, therefore, an object of the invention to provide a print system which can obtain a print output of high quality from an information appliance. Another object of the invention is to provide a print system, a printing method, a printer, a terminal apparatus, and a server which can reduce a burden of communication at the time of downloading data of a large communication capacity.

Still another object of the invention is to provide a print system, a printing method, a printer, a terminal apparatus, and a server which can print detailed data of high precision even if the printer cannot be connected to the Internet.

Further another object of the invention is to provide a print system, a printing method, a printer, a terminal apparatus, and a server which can print contents information even if the server holding the contents information does not have converting means for converting the contents information into the printing data.

To accomplish the above objects, according to the invention, there is provided a print system in which a server and a printer are connected to a network, comprising:

input means for inputting a print instruction in which first position information has been designated;

extracting means for extracting second position information from the first position information;

forming means for forming print data on the basis of the second position information; and printing means for printing on the basis of the print data.

According to the invention, there is provided a printing method in a print system in which a server and a printer are connected to a network, comprising:

an input step of inputting a print instruction in which first position information has been designated;

an extracting step of extracting second position information from the first position information;

a forming step of forming print data on the basis of the second position information; and a printing step of printing on the basis of the print data.

According to the invention, there is provided a server comprising:

extracting means for extracting second position information from first position information included in a print request which is inputted;

forming means for forming print data on the basis of the second position information; and means for transferring the print data formed by the forming means to a printer.

According to the invention, there is provided a printing method comprising:

an extracting step of extracting second position information from first position information included in a print request which is inputted;

a forming step of forming print data on the basis of the second position information; and a step of transferring the print data formed by the forming step to a printer.

According to the invention, there is provided a printer to which an information appliance and a server are connected, comprising:

means for receiving a print instruction from the information appliance;

means for issuing a print request to the server in response to the print instruction from the information appliance; and means for receiving print data formed by the server in response to the print request.

According to the invention, there is provided a printing method in a print system in which an information appliance, a printer, and a server are connected, wherein:

the information appliance transfers a print instruction to the printer;

the printer issues a print request to the server in response to the print instruction from the information appliance; and the server transfers print data formed in response to the print request from the printer to the printer.

DETAILED DESCRIPTION OF THE PREFERRED EMBODIMENTS

Embodiments of a print system, a printing method, a printer, a terminal apparatus, and a server of the invention will now be described with reference to the drawings.

First Embodiment

Figure 1:
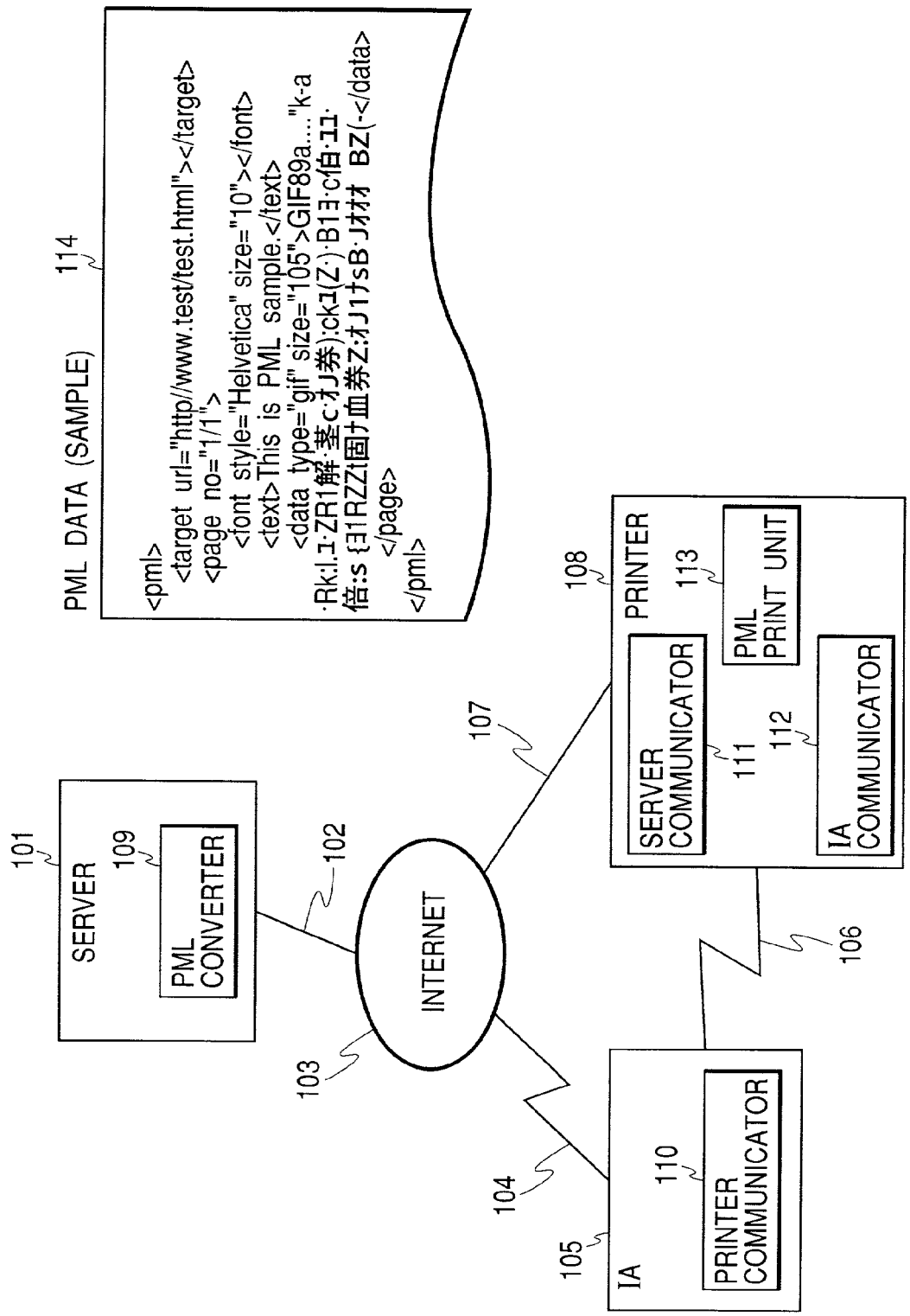
FIG. 1 is a diagram showing a construction of a print system according to the first embodiment.

FIG. 1 is a diagram showing a construction of a print system according to the first embodiment. The print system has a construction such that an information appliance (hereinafter, simply referred to as an IA) 105, a server 101, and a printer 108 are connected through an Internet 103. The server 101 is connected to the Internet 103, functions as a WEB server, and has a PML converter 109. When a request for the print data is received from the printer 108, the PML converter 109 converts the printing data into PML (Print Markup Language) data and outputs it. If the printing data has previously been described by the PML, the PML converter 109 skips the PML conversion.

The IA 105 is an information appliance, a cellular phone, or the like and connected to the Internet 103 via a network 104 to a carrier or a provider to which the IA belongs. The IA 105 has a printer communicator 110 and can communicate with the printer 108 via a network 106 such as radio communication or the like.

The printer 108 has a server communicator 111, an IA communicator 112, and a PML print unit 113. The printer 108 can communicate with the IA 105 via a network such as radio communication or the like by the IA communicator 112. As mentioned above, the IA 105 and printer 108 are locally connected by the printer communicator 110 and IA communicator 112.

The printer 108 is also connected to the Internet 103 by the server communicator 111 through a network 107. The printer 108 requests the printing data from the server 101, thereby printing the received PML data by the PML print unit 113.

In the diagram, reference numeral 114 denotes a sample of the PML data which is sent from the server 101 to the printer. The PML is a printing data description language of an XML base which can be sent and received on an arbitrary line unit basis in accordance with a processing ability of the printer and is described as data added with print instruction information such as page, font designation, or the like besides data such as text, image, or the like.

The IA 105 obtains contents information from the Internet 103 through the network 104. In case of printing data (contents/document) such as contents, document, or the like as obtained contents information, the IA 105 notifies the printer 108 of the contents information by the printer communicator 110.

The printer 108 receives the contents information and print request sent from the IA 105 via the network 106 by the IA communicator 112. The printer 108 notifies the server 101 of a request for the contents/document through the network 107 by the server communicator 111.

The server 101 which received the request from the printer 108 converts the designated contents/document into the PML data by the PML converter 109 and sends it to the printer 108 via a network 102, Internet 103, and network 107. The printer 108 which received the PML data converts it into the print data and prints it by the PML print unit 113.

Figure 2:
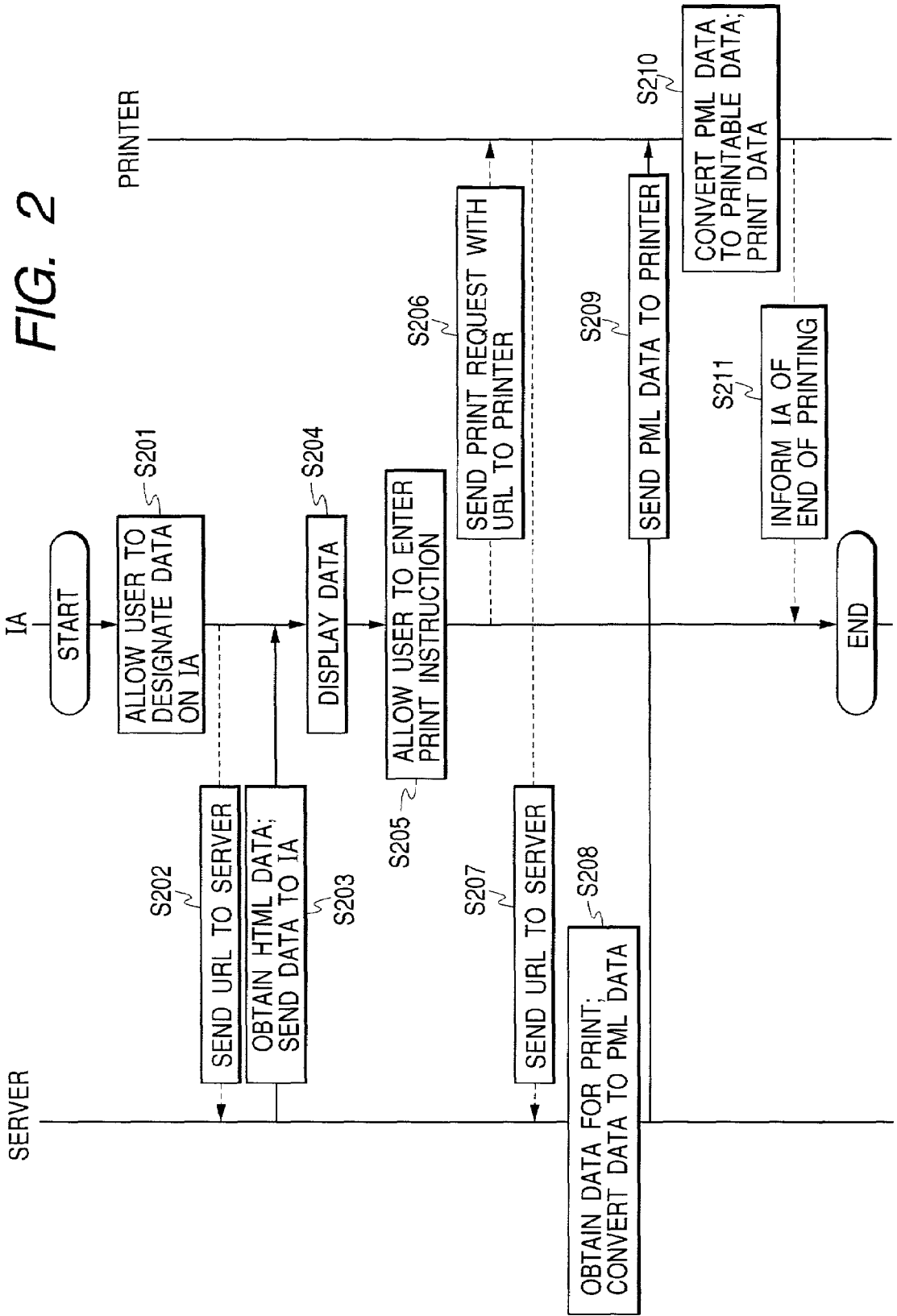
FIG. 2 is a diagram showing a print operating procedure of the print system.

FIG. 2 is a diagram showing a print operating procedure of the print system. First, the user operates the IA 105 and designates data such as contents or the like to be displayed to the IA 105 (S201).

The IA 105 sends position information (hereinafter, simply referred to as "URL") such as a URL or the like of the designated data to the server 101 via the Internet 103 (S202). Display data described by an HTML or the like in accordance with an http protocol is obtained (S203). The obtained display data is displayed (S204).

After that, the user instructs the printing from the IA 105 (S205). Thus, the IA 105 designates the URL of the displayed data by the printer communicator 110 and issues a print request to the printer 108 (S206).

The printer 108 which received the print request is connected to the server 101 in accordance with the http protocol and notifies the server 101 of the URL of the display data received from the IA 105 (S207).

The server 101 which received the notification obtains the display data on the basis of the URL of the display data, extracts the URL of the printing data in the display data, and obtains the printing data from the URL of the printing data. Further, if a format of the obtained printing data is not the PML format suitable for the printing and communication, the printing data is converted into the PML data by the PML converter 109 (S208). The PML data is sent to the printer 108 on the requesting source side (S209). If the format of the obtained printing data is the PML format suitable for the printing and communication, the printing data is sent as it is.

The printer 108 which received the PML data interprets the PML data by the PML print unit 113, converts it into the printable data, and prints it (S210). After the end of the printing, the printer 108 notifies the IA 105 of the end of the printing (S211).

As mentioned above, according to the print system of the first embodiment, in case of printing and outputting from the IA 105, the detailed data of high precision of an amount which is equal to or larger than the data amount that is obtained from a small screen of the IA 105, a memory of a small capacity, and the thin network 106 of a small transmission capacity can be printed. Upon printing, by sending the printing data by the print data description language (PML) of the XML format, a burden of the communication between the server 101 and printer 108 can be reduced. Thus, a print output of high quality can be obtained from a terminal apparatus and a burden of the communication in case of downloading data of a large communication capacity can be reduced.

In place of the method whereby the server 101 executes the processes for interpreting the URL of the display data and obtaining the URL for printing in step S208 in FIG. 2, it is also possible to use a method whereby the printer 108 which received the print request executes the processes for interpreting the URL of the display data and obtaining the URL for printing and, in step S207, the printing URL is sent to the server 101 in place of the URL for displaying. In this case, the server 101 skips the process for obtaining the printing URL from the display data in S208.

In place of the method whereby the server 101 executes the processes for interpreting the URL of the display data and obtaining the URL for printing in step S208 in FIG. 2, it is also possible to use a method whereby the IA 105 to instruct the printing executes the processes for interpreting the URL of the display data and obtaining the URL for printing and, in steps S206 and S207, the printing URL is sent in place of the URL for displaying. In this case, the server 101 skips the process for obtaining the printing URL from the display data in S208.

Further, in the IA 105, in case of instructing the printing in S205, the printing can be also requested by designating the displayed data itself instead of the print request for the printing data corresponding to the display data. In this case, the server 101 skips the process for obtaining the URL of the printing data from the URL of the display data in S208 and executes the process for obtaining the display data.

Second Embodiment

Figure 3:
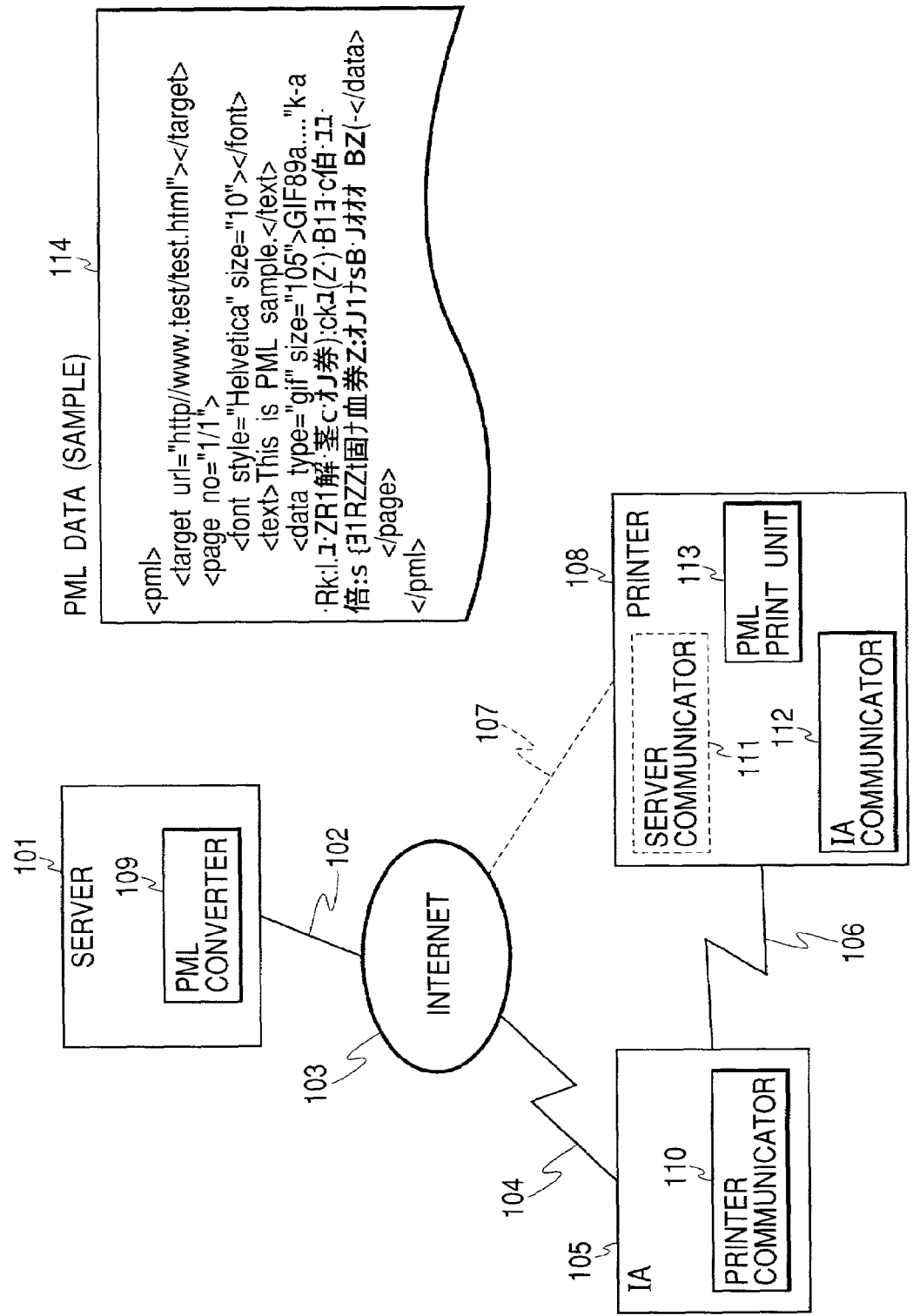
FIG. 3 is a diagram showing a construction of a print system according to the second embodiment.

FIG. 3 is a diagram showing a construction of a print system according to the second embodiment. The same component elements as those in the first embodiment are designated by the same reference numerals and their descriptions are omitted here. In the second embodiment, there is shown a print output in the case where the printer 108 cannot be connected to the Internet 103 due to some reasons and the server communicator 111 is in an unusable state. At this time, the printer 108 can communicate with the IA 105 via the network 106 by using the printer communicator 110.

Figure 4:
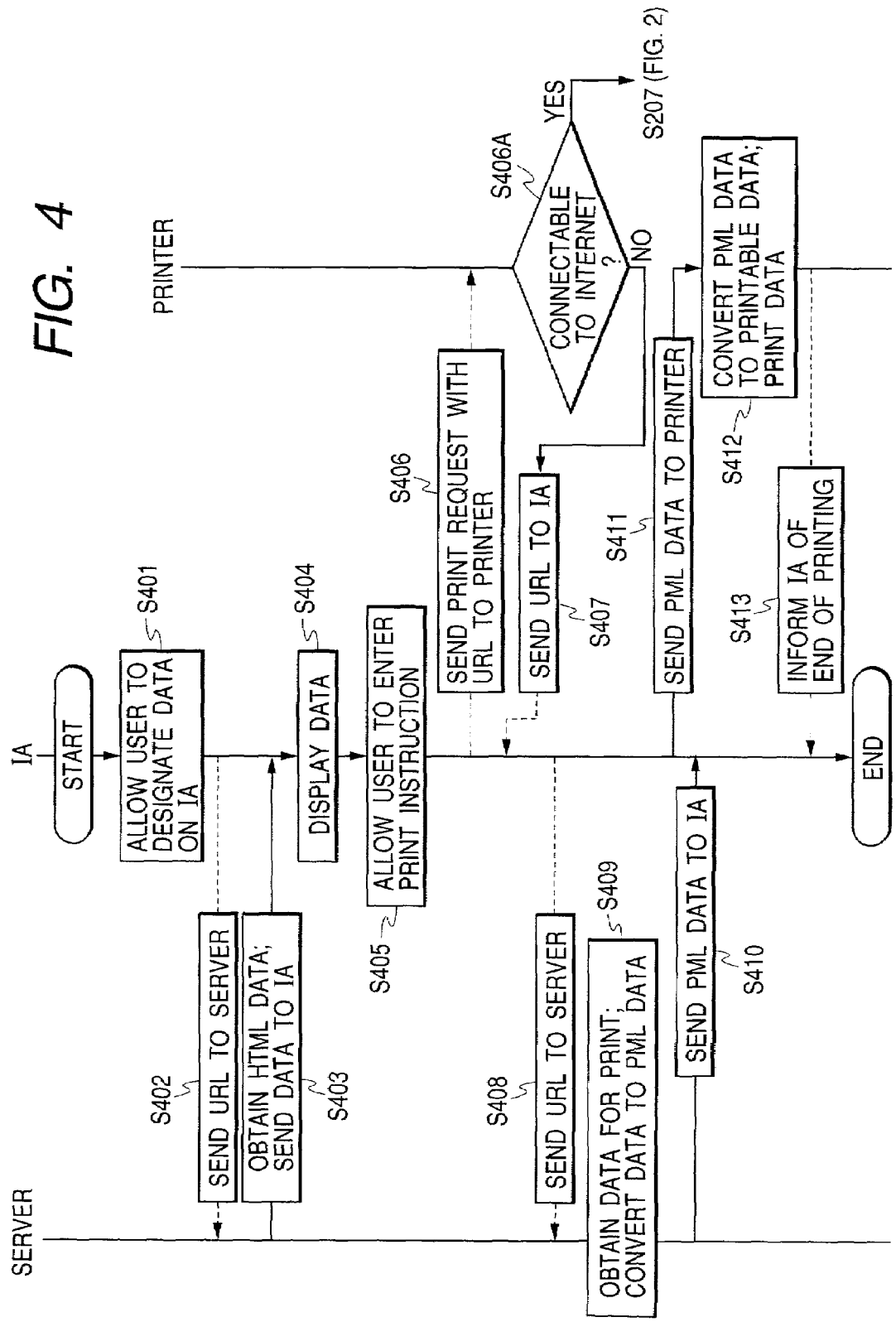
FIG. 4 is a diagram showing a print operating procedure of the print system in the second embodiment.

FIG. 4 is a diagram showing a print operating procedure for the print system in the second embodiment. First, the user operates the IA 105 and designates data such as contents or the like to be displayed to the IA 105 (S401).

The IA 105 sends the position information (hereinafter, simply referred to as "URL") such as a designated URL or the like to the server 101 via the Internet 103 (S402). The display data is obtained in accordance with the http protocol (S403) and the obtained display data is displayed (S404).

After that, the user instructs the printing from the IA 105 (S405). Thus, the IA 105 designates the URL of the displayed data by the printer communicator 110 and notifies the printer 108 of the print request (S406).

The printer 108 which received the print request discriminates whether the printer 108 can be connected to the Internet (server 101) or not (S406A). If it is determined that the printer 108 cannot be connected, the printer 108 is connected to the IA 105 by the IA communicator 112 and notifies the IA 105 of the URL of the display data notified from the IA 105 (S407). The IA 105 which received the notification from the printer 108 is connected to the server 101 in accordance with the http protocol and notifies the server 101 of the URL of the display data received from the printer 108 (S408).

If it is determined that the printer 108 can be connected to the Internet (server 101), step S207 in FIG. 2 follows. The printer 108 is connected to the server 101 in accordance with the http protocol and notifies the server 101 of the URL of the display data received from the printer 108. The subsequent processes in FIG. 2 are executed.

The server 101 which received the notification obtains the display data on the basis of the URL of the display data, extracts the URL of the printing data in the display data, and obtains the printing data from the URL of the printing data. Further, if the format of the obtained printing data is not the PML format suitable for the printing and communication, the printing data is converted into the PML data by the PML converter 109 (S409). The PML data is sent to the IA 105 (S410). The IA 105 which received the PML data sends the PML data to the printer 108 by the printer communicator 110 (S411). If the format of the obtained printing data is the PML format suitable for the printing and communication, the printing data is sent as it is.

The printer 108 which received the PML data interprets the PML data by the PML print unit 113, converts it into the printable data, and prints it (S412). Upon completion of the printing, the printer 108 notifies the IA 105 of the completion of the printing (S413).

As mentioned above, in the second embodiment, even if the printer 108 is in a state where it cannot be connected to the Internet 103, the detailed data of a high precision can be printed.

In a manner similar to the first embodiment, in place of the method whereby the server 108 executes the processes for interpreting the URL of the display data and obtaining the URL for printing in step S409 in FIG. 4, it is also possible to use a method whereby the printer 108 which received the print request executes the processes for interpreting the URL of the display data and obtaining the URL for printing and, in step S407, the printing URL is sent to the IA 105 in place of the URL for displaying. In this case, the server 101 skips the process for obtaining the printing URL from the display data in S409.

In place of the method whereby the server 108 executes the processes for interpreting the URL of the display data and obtaining the URL for printing in step S409 in FIG. 4, it is also possible to use a method whereby the IA 105 to instruct the printing executes the processes for interpreting the URL of the display data and obtaining the URL for printing and, in steps S406, S407, and S408, the printing URL is sent in place of the URL for displaying. In this case, the server 101 skips the process for obtaining the printing URL from the display data in S409.

Further, in the IA 105, in case of instructing the printing in S405, the printing can be also requested by designating the displayed data itself instead of the print request for the printing data corresponding to the display data. In this case, the server 101 skips the process for obtaining the URL of the printing data from the URL of the display data in S409 and executes the process for obtaining the display data.

Third Embodiment

Figure 5:
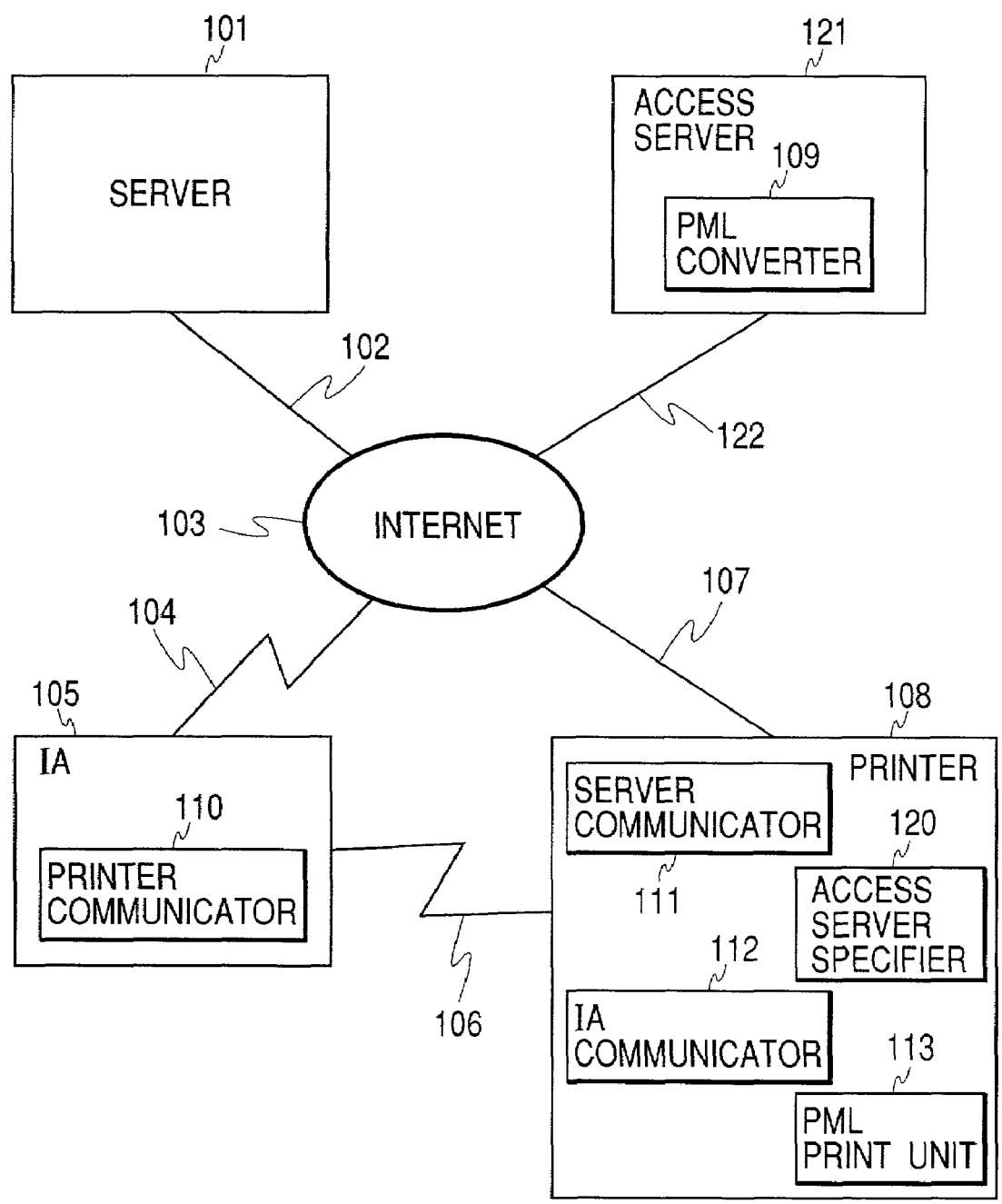
FIG. 5 is a block diagram showing a construction of a print system according to the third embodiment.

FIG. 5 is a block diagram showing a construction of a print system according to the third embodiment. The same component elements as those in the first embodiment are designated by the same reference numerals and their descriptions are omitted here. A different construction will be described. That is, in the third embodiment, an access server 121 is connected to the Internet 103. The PML converter 109 is provided for the access server 121 instead of the server 101. An access server specifier 120 is provided for the printer 108.

The IA 105 obtains the contents information through the network 104. To print the obtained contents information (contents/document), the IA 105 notifies the printer 108 of the contents information by the printer communicator 110.

The printer 108 receives the contents information and print request (instruction) from the IA 105 through the network 106 by the IA communicator 112. The printer 108 issues a transmitting request for the contents information by the server communicator 111 and network 107 to the server having the address specified by the access server specifier 120, that is, to the access server 121.

The access server 121 which received the request from the printer 108 obtains data from the server 101 holding the contents information through the network 102, Internet 103, and a network 122, converts it into the PML data by the PML converter 109, and sends it to the printer 108 through the network 122, Internet 103, and network 107 after the conversion. The printer 108 which received the PML data converts it into the printing data by the PML print unit 113, and prints it.

According to the third embodiment as mentioned above, the contents information can be printed even if the server holding the contents information does not have the converting means for converting the contents information into the printing data.

In the embodiment, although the PML converter 109 is provided for the access server 121, the PML converter can be also provided for another server different from the access server 121.

The contents information (contents/document) can be also provided for the same server as the access server 121.

Further, the address of the server can be also set into the access server specifier 120 by the IA without limiting to the printer, or it can be set by another server.

The access server specifier 120 can also specify the same server until the address is newly set or the specified server can be also used only once upon printing.

Although the print system in which each apparatus is connected through the Internet has been shown in the embodiment, an Intranet or another network can be also used in place of the Internet.

Although the PML converter has been provided for the server in the embodiment, the PML converter can be also provided for the printer. In this case, the data such as contents, document, or the like is sent as it is from the server to the printer. On the printer side, the data such as contents, document, or the like is converted into the PML data and printed.

Further, the server can also have a printing data generating unit for generating data peculiar to the printer on the basis of the PML data converted by the PML converter. By generating the data peculiar to the printer and sending it to the printer, the processes on the printer side can be reduced.

Although only the terminal apparatus obtains the position information of the contents information as a print target, either the server or the printer can also obtain it without limiting to the terminal apparatus.

A plurality of Intranets such as an LAN and the like besides the Internet can also exist on the network to which the server, IA, and printer are connected. The IA and the printer can be also connected by local communication, and they can be connected by radio communication, infrared ray communication, cables, or the like.

According to the invention, in case of printing and outputting from the terminal apparatus, the detailed data of a high precision whose data amount is equal to or larger than an amount which is obtained by a small screen of such an apparatus, a memory of a small capacity, and a thin network line of a small transmission capacity can be printed. Upon printing, by sending the printing data by the print data description language of the XML format, a burden of the communication between the server and the printer can be reduced. As mentioned above, the print output of high quality can be obtained from the terminal apparatus and a burden of the communication at the time of downloading the data of a large communication capacity can be reduced.

According to the invention, the detailed data of a high precision can be printed even in a state where the printer is not connected to the Internet.

Further, according to the invention, the contents information can be printed even if the server holding the contents information does not have the converting means for converting the contents information into the printing data.

Fourth Embodiment

Figure 6:
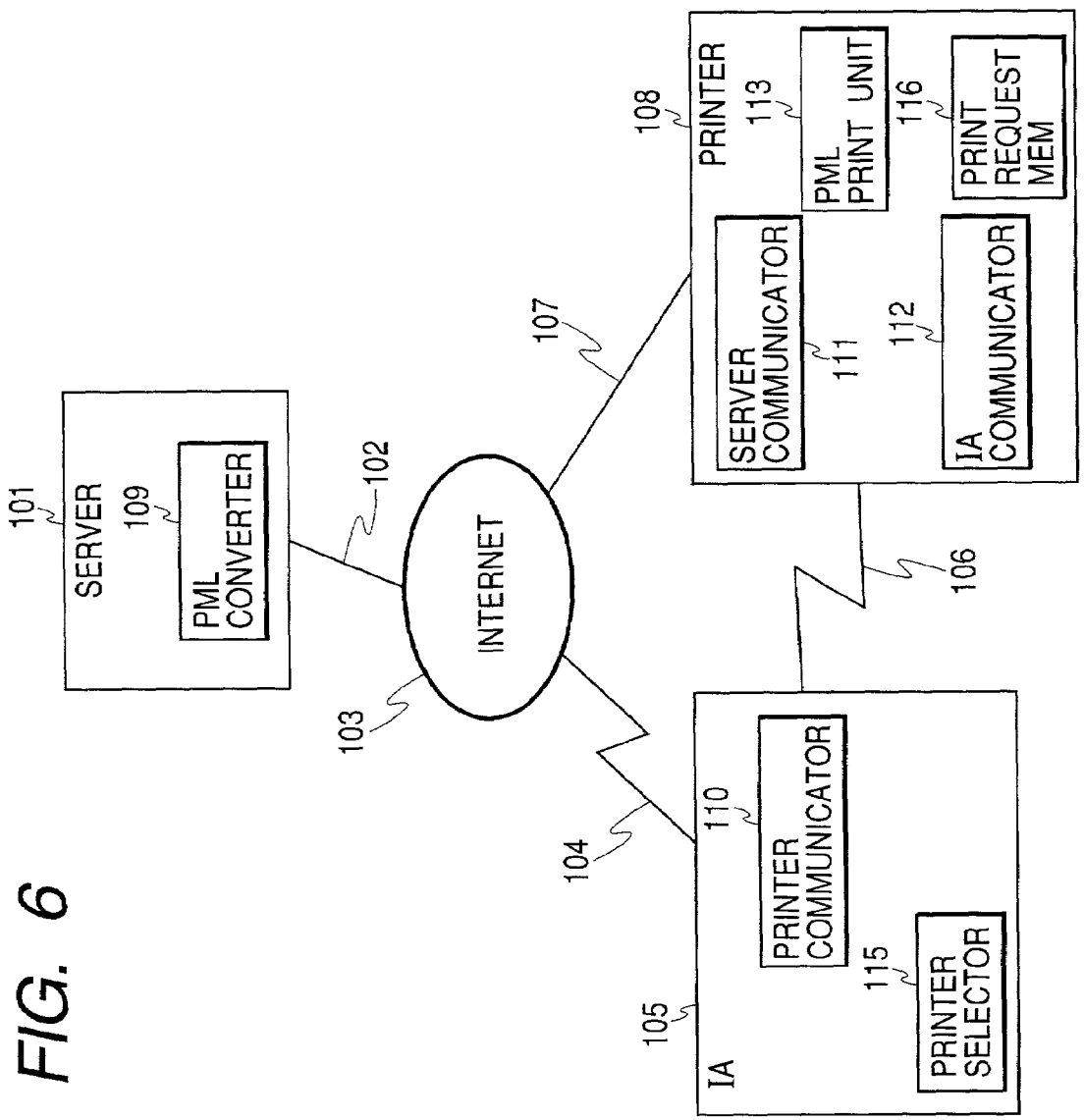
FIG. 6 is a diagram showing a construction of a print system according to the fourth embodiment.

Embodiments of a print system, a printing method, a printer, a terminal apparatus, and a server of the present invention will now be described with reference to the drawings. FIG. 6 is a diagram showing a construction of the print system of the embodiment. The print system has a construction such that the IA 105, server 101, and printer 108 are connected through the Internet 103. The server 101 is connected to the Internet 103, functions as a WEB server, and has the PML converter 109. When a request for the print data is received from the printer 108, the PML converter 109 converts the printing data into the PML data and sends it. If the printing data has previously been described by the PML, the PML converter 109 skips the PML conversion.

The IA 105 is an information appliance, a cellular phone, or the like and connected to the Internet 103 via the network 104 to the carrier or provider to which the IA belongs. The IA 105 has the printer communicator 110 and can communicate with the printer 108 via the network 106 such as radio communication (for example, Blue Tooth) or the like.

Mutual recognition with one or more printers is also performed by the printer communicator 110. Further, the IA 105 has a printer selector 115 and an arbitrary printer can be designated by the printer selector 115 from the printers recognized by the printer communicator 110.

The printer 108 has the server communicator 111, the IA communicator 112, the PML print unit 113, and a print request memory 116. The printer 108 can communicate with one or more IA 105 via a network such as radio communication (Blue Tooth) or the like by the IA communicator 112. As mentioned above, the IA 105 and printer 108 are locally connected by the printer communicator 110 and IA communicator 112.

The printer 108 is also connected to the Internet 103 by the server communicator 111 through the network 107. The printer 108 requests the printing data from the server 101, thereby printing the received PML data by the PML print unit 113.

The printer communicator 110 and IA communicator 112 mutually approach within a predetermined distance, thereby performing the mutual recognition. When the IA 105 enters a mutual recognizing state with the printer 108, the IA 105 can request the printer 108 to print the data. When the print request is received from the IA 105, the printer 108 once stores the print request into the print request memory 116 and prints the PML data received from the server 101 by the PML print unit 113 in response to the request for the printing data to the server 101.

The PML is the printing data description language of the XML base which can be sent and received on an arbitrary line unit basis in accordance with a processing ability of the printer and is described as data added with print instruction information such as page, font designation, or the like besides data such as text, image, or the like.

Figure 7:
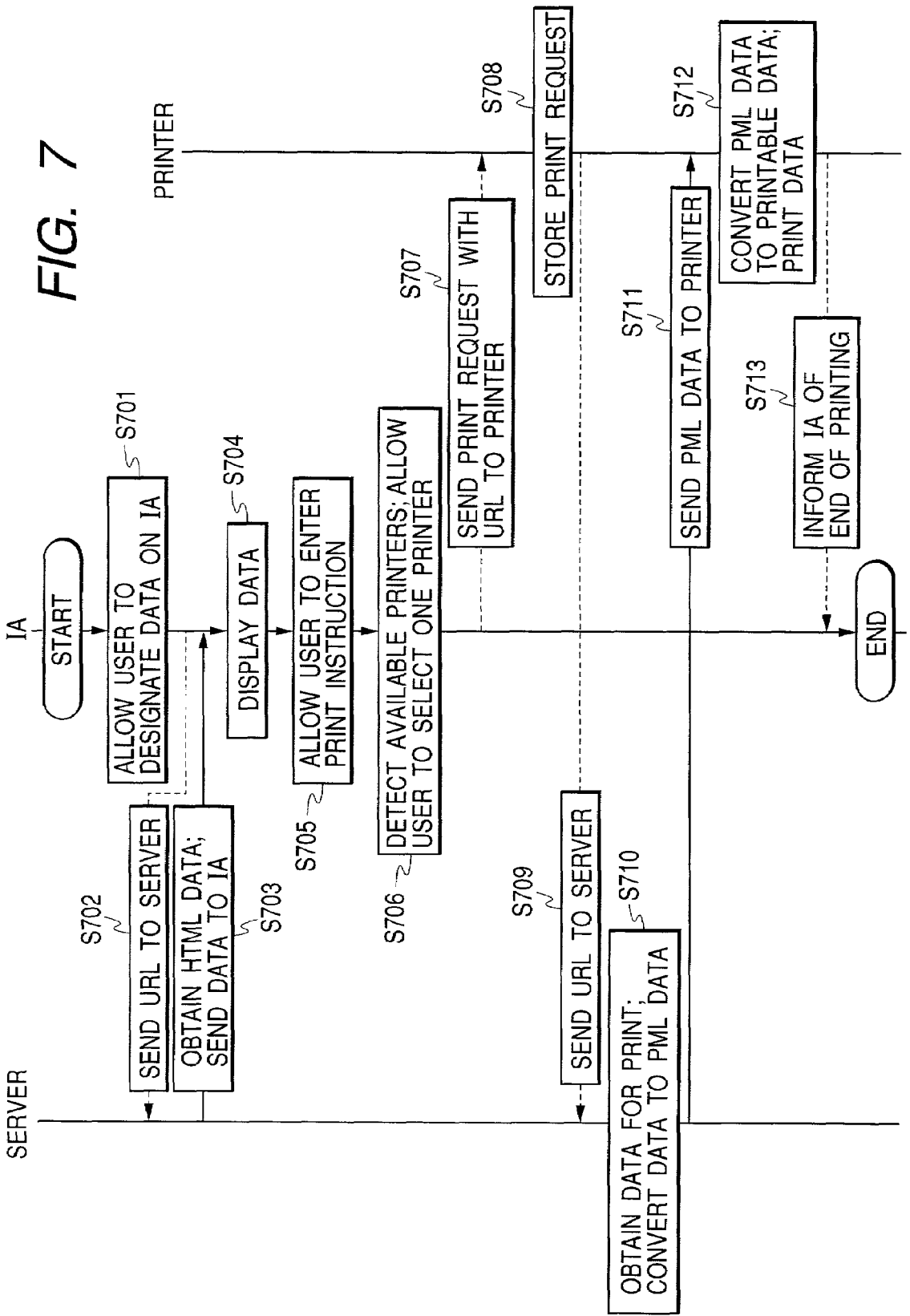
FIG. 7 is a diagram showing a print operating procedure of the print system.

FIG. 7 is a diagram showing a print operating procedure of the print system. First, the user operates the IA 105 and designates data such as contents or the like to be displayed to the IA 105 (S701).

The IA 105 sends position information (hereinafter, simply referred to as "URL") such as a URL or the like of the designated data to the server 101 via the Internet 103 (S702). Display data described by the HTML or the like in accordance with the http protocol is obtained (S703). The obtained display data is displayed (S704).

After that, the user instructs the printing from the IA 105 (S705). The printer selector 115 detects the printers existing around the present position which the IA 105 recognizes at present, displays a list of the detected printers, and selects one of the printers to which the user requests the designated printing from the list (S706). If the number of recognized printers is equal to 1, the selecting step can be omitted here. If no printer is recognized, it is also possible to control the system so that the user cannot instruct the printing. In this case, if the user issues the print instruction, it is also possible to control the system so that the user is notified of an error.

Thus, the IA 105 designates the URL of the displayed data by the printer communicator 110 and issues a print request to the printer 108 (S707).

The printer 108 which received the print request stores the print request into the print request memory 116 (S708). When the print request is stored, ID information to specify the IA as a requesting source and the like besides the print request information are simultaneously stored and requests from a plurality of IAs can be accepted at any time. The print request memory 116 sequentially extracts the stored print requests and executes the following printing process.

The printer 108 which received the print request is connected to the server 101 in accordance with the http protocol and notifies the server 101 of the URL of the display data received from the IA 105 (S709).

The server 101 which received the notification obtains the display data on the basis of the URL of the display data, extracts the URL of the printing data in the display data, and obtains the printing data from the URL of the printing data. Further, if a format of the obtained printing data is not the PML format suitable for the printing and communication, the printing data is converted into the PML data by the PML converter 109 (S710). The PML data is sent to the printer 108 on the requesting source side (S711). If the format of the obtained printing data is the PML format suitable for the printing and communication, the printing data is sent as it is.

The printer 108 which received the PML data interprets the PML data by the PML print unit 113, converts it into the printable data, and prints it (S712). After the end of the printing, the printer 108 notifies the IA 105 of the end of the printing (S713).

As mentioned above, according to the print system of the embodiment, in case of printing from the IA 105, by allowing the IA to approach an arbitrary printer 108 without previously registering the printer 108, the printer 108 can be automatically recognized and the data can be printed. At the same time, a plurality of terminal apparatuses and printers can dynamically make the print request again.

In the embodiment, when a plurality of printers are recognized within a predetermined range, the user selects a specific one of the plurality of printers. However, it is also possible to construct the system in a manner such that the terminal apparatus automatically selects the specific printer, for example, it selects the printer connected to a line whose communication quality is most stable and executes the printing.

Further, in the embodiment, the IA 105 has performed the mutual recognition with the printers 108 existing within a predetermined range of, for example, 20 m by the radio communication (Blue Tooth). However, in case of connecting the IA and the printer by infrared ray communication, a cable, or the like other than the radio communication, the mutual recognition can be performed within a range according to each of those communicating methods.

Although the print system in which the apparatuses are connected through the Internet has been shown in the embodiment, they can be also connected by the Intranet or another network in place of the Internet.

Although the PML converter has been provided for the server in the embodiment, the PML converter can be also provided for the printer. In this case, the data such as contents, document, or the like is sent as it is from the server to the printer. On the printer side, the data such as contents, document, or the like is converted into the PML data and printed.

Further, the server can also have a printing data generating unit for generating data that is peculiar to the printer on the basis of the PML data converted by the PML converter. By generating the data that is peculiar to the printer and sending it to the printer, the processes on the printer side can be reduced.

Although only the terminal apparatus has obtained the position information of the contents information as a target of printing, either the server or the printer can also obtain it without limiting to only the terminal apparatus.

As a network to which the server, IA, and printer are connected, a plurality of Intranets such as LAN and the like besides the Internet can be also used.

According to the invention, when the printing is performed from the terminal apparatus, by allowing the terminal apparatus to approach an arbitrary printer without previously registering the printers, the printer can be automatically recognized and the data can be printed. At the same time, a plurality of terminal apparatuses and printers can dynamically send and receive the print requests.

Therefore, even if the user is out or the like, when the user designates the contents information obtained at the terminal apparatus and prints it by the printer through the server, by allowing the connecting relation among a plurality of terminal apparatuses and the printer to be dynamically mutually recognized, an arbitrary print request can be sent and received among the plurality of terminal apparatuses and the printer.

Fifth Embodiment

Figure 8:
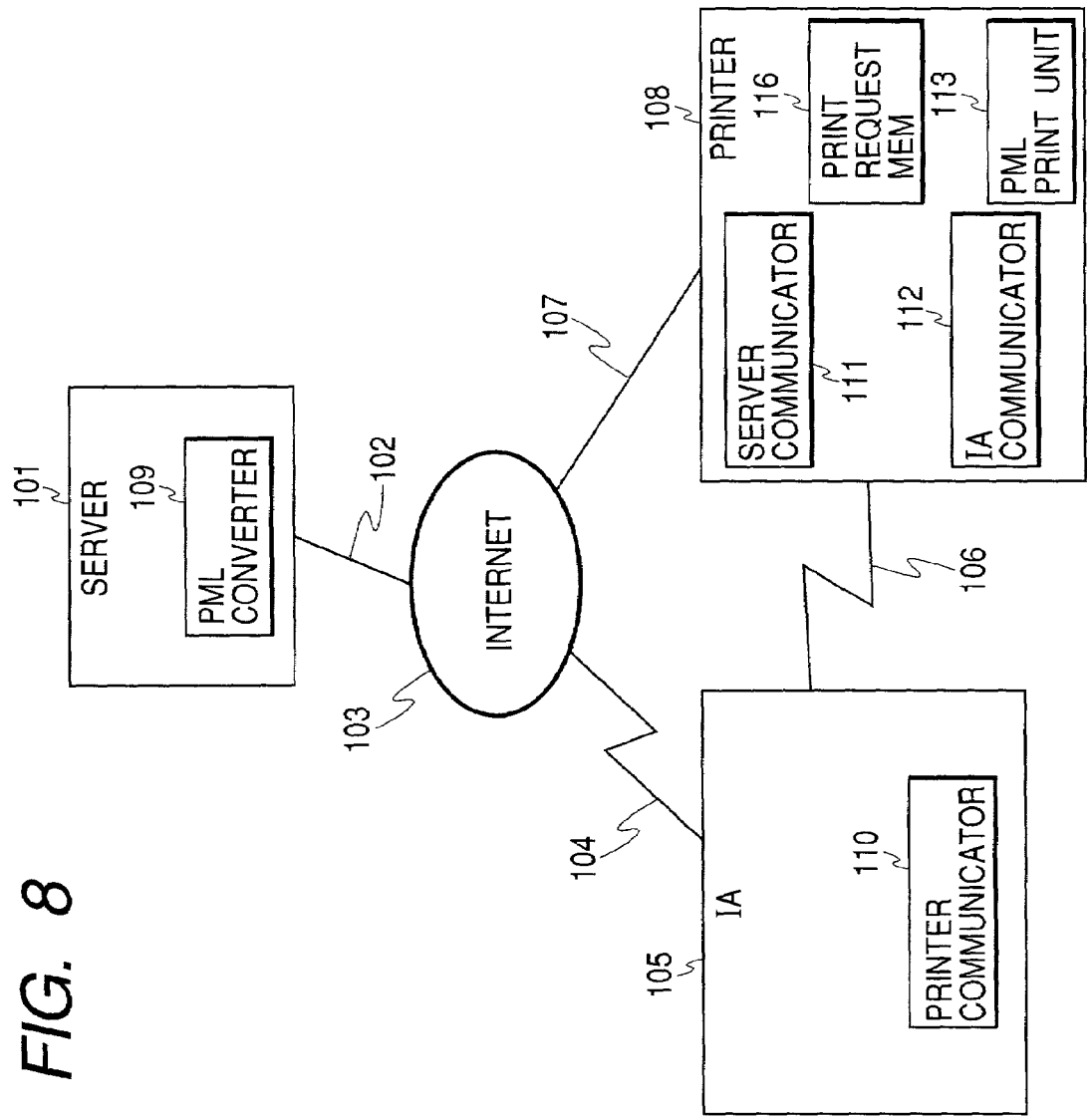
FIG. 8 is a diagram showing a construction of a print system according to the fifth embodiment.

FIG. 8 is a diagram showing a construction of a print system according to the fifth embodiment. The print system has a construction such that the IA 105, server 101, and printer 108 are connected through the Internet 103. The server 101 is connected to the Internet 103, functions as a WEB server, and has the PML converter 109. When a request for the print data is received from the printer 108, the PML converter 109 converts the printing data into the PML data and sends it. If the printing data has previously been described by the PML, the PML converter 109 skips the PML conversion.

The IA 105 is an information appliance, a cellular phone, or the like and connected to the Internet 103 via the network 104 to the carrier or provider to which the IA belongs. The IA 105 has the printer communicator 110 and can communicate with the printer 108 via the network 106 such as radio communication or the like.

The printer 108 has the server communicator 111, IA communicator 112, PML print unit 113, and print request memory 116. The printer 108 can communicate with the IA 105 via a network such as radio communication or the like by the IA communicator 112. As mentioned above, the IA 105 and printer 108 are locally connected by the printer communicator 110 and IA communicator 112.

The printer 108 is also connected to the Internet 103 by the server communicator 111 through the network 107. The printer 108 requests the printing data from the server 101, thereby printing the received PML data by the PML print unit 113.

The PML is the printing data description language of the XML base which can be sent and received on an arbitrary line unit basis in accordance with a processing ability of the printer and is described as data added with print instruction information such as page, font designation, or the like besides data such as text, image, or the like.

The IA 105 designates the position information such as a URL or the like and obtains the contents information from the Internet 103 through the communication line 104 such as a network or the like. In case of printing the data (contents/document or contents information) such as contents, document, or the like as obtained contents information, the IA 105 notifies the printer 108 of the contents information by the printer communicator 110.

The printer 108 receives the contents information (URL) and print request sent from the IA 105 through the network 106 by the IA communicator 112. The printer 108 stores the print request of the contents information into the print request memory 116. When the printer 108 issues the request for the contents/document to the server 101 through the network 107 by the server communicator 111, if a series of operations for receiving the PML data from the server 101, converting it into the printing data by the PML print unit 113, and printing it is not executed, the printer 108 obtains the contents information (URL) of one print request from the print request memory 116 and issues the transmitting request of the contents information to the server 101 by the server communicator 111 and network 107.

The server 101 which received the request from the printer 108 converts the contents/document designated by the URL into the PML data by the PML converter 109 and sends it to the printer 108 through the network 102, Internet 103, and network 107. The printer 108 which received the PML data converts it into the printing data by the PML print unit 113 and prints it. After the end of the printing, the printer 108 deletes the print request of the contents information from the print request memory 116.

According to the print system of the fifth embodiment as mentioned above, when the user designates the contents information obtained by the IA 105 and instructs the printer 108 to print, the print request can be continuously received and the printing can be executed irrespective of the state of the printer 108.

The printer 108 can also obtain and display the information of the print request stored in the print request memory 116, for example, a list of the position information. Further, the printer 108 can also stop or delete the corresponding print request in the position information displayed as a list.

The IA 105 can also obtain and display the information of the print request stored in the print request memory 116, for example, a list of the position information through the printer communicator 110, network 106, and IA communicator 112. Similarly, the IA 105 can also stop or delete the corresponding print request in the position information displayed as a list.

The URL of the contents to be printed includes a URL for display of the IA or a URL for printing extracted from the display URL of the IA.

Sixth Embodiment

Figure 9:
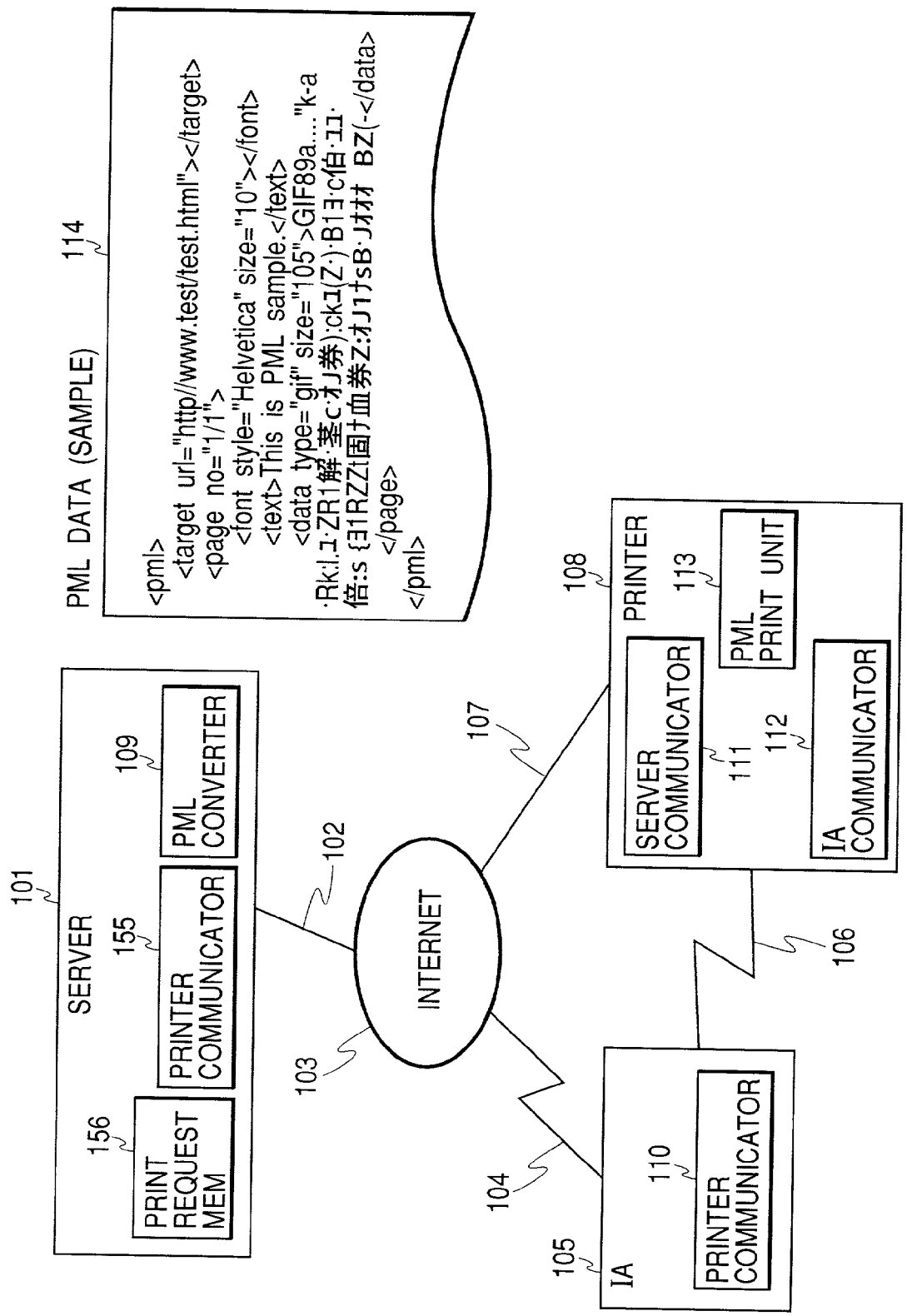
FIG. 9 is a diagram showing a construction of a print system according to the sixth embodiment.

FIG. 9 is a diagram showing a construction of a print system according to the sixth embodiment. The same component elements as those in the fifth embodiment are designated by the same reference numerals. The print system has a construction such that the IA 105, server 101, and printer 108 are connected through the Internet 103. The server 101 is connected to the Internet 103, functions as a WEB server, and has a print request memory 156, a printer communicator 155, and the PML converter 109. When a request for the print data is received from the printer 108, the PML converter 109 converts the printing data into the PML data and sends it. If the printing data has previously been described by the PML, the PML converter 109 skips the PML conversion.

The IA 105 is an information appliance, a cellular phone, or the like and connected to the Internet 103 via the network 104 to the carrier or provider to which the IA belongs. The IA 105 has the printer communicator 110 and can communicate with the printer 108 via the network 106 such as radio communication or the like.

The printer 108 has the server communicator 111, IA communicator 112, PML print unit 113, and print request memory 116. The printer 108 can communicate with the IA 105 via a network such as radio communication or the like by the IA communicator 112. As mentioned above, the IA 105 and printer 108 are locally connected by the printer communicator 110 and IA communicator 112.

The printer 108 is also connected to the Internet 103 by the server communicator 111 through the network 107. The printer 108 requests the printing data from the server 101, thereby printing the received PML data by the PML print unit 113.

In the diagram, reference numeral 114 denotes the sample of the PML data which is sent from the server 101 to the printer 108. The PML is a printing data description language of an XML base which can be sent and received on an arbitrary line unit basis in accordance with a processing ability of the printer and is described as data added with print instruction information such as page, font designation, or the like besides data such as text, image, or the like.

The IA 105 obtains contents information from the Internet 103 through the network 104. In case of printing data (contents/document or contents information) such as contents, document, or the like as obtained contents information, the IA 105 notifies the printer 108 of the contents information by the printer communicator 110.

The printer 108 receives the contents information and print request sent from the IA 105 via the network 106 by the IA communicator 112. The printer 108 notifies the server 101 of a request for the contents/document through the network 107 by the server communicator 111.

The server 101 which received the request (print request) from the printer 108 stores it into the print request memory 156, once converts the contents/document into the PML data designated by the stored print request by the PML converter 109, and sends it to the printer 108 by the printer communicator 155 via a network 102, Internet 103, and network 107. The printer 108 which received the PML data converts it into the printing data and prints it by the PML print unit 113.

Figure 10:
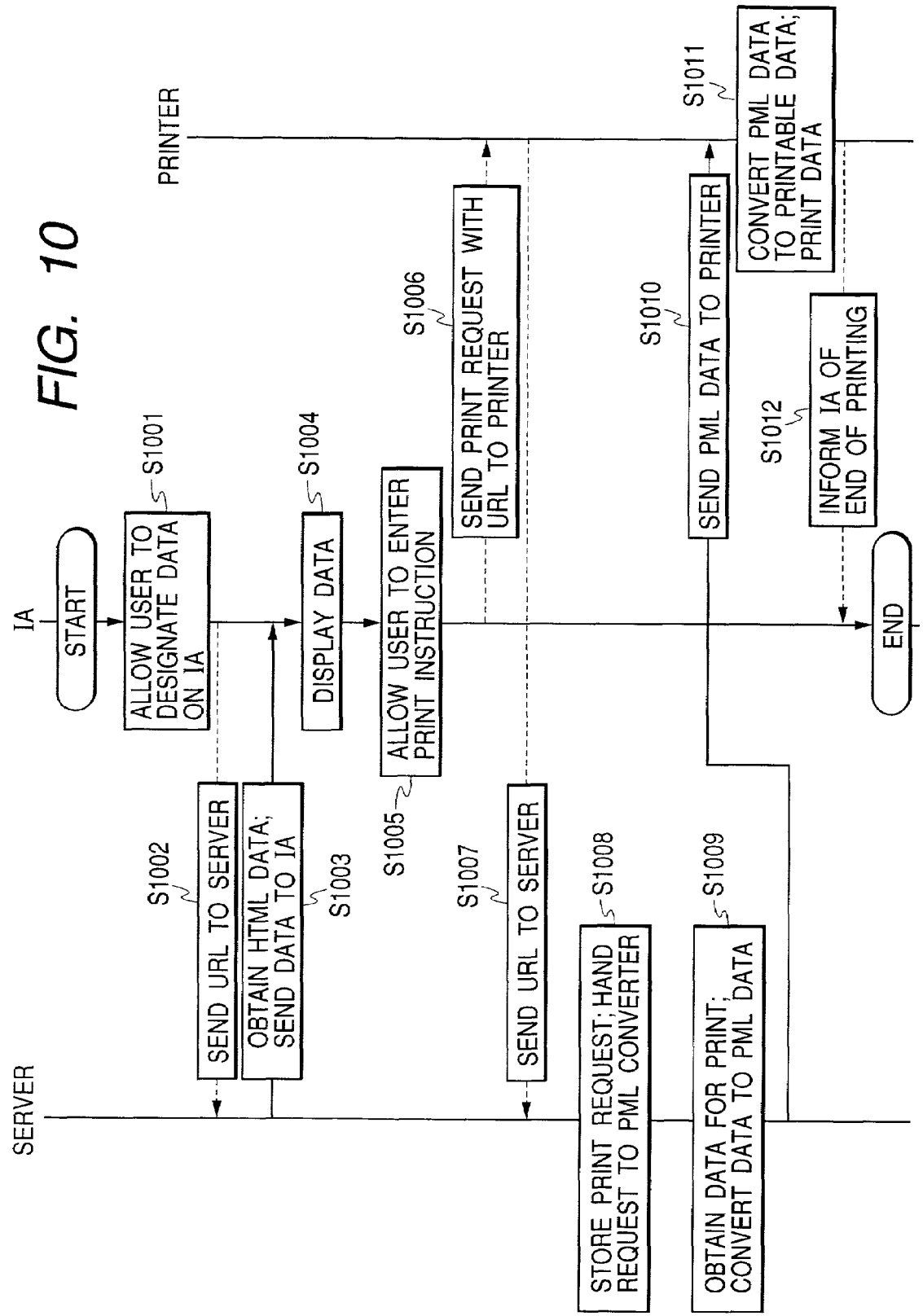
FIG. 10 is a diagram showing a print operating procedure of the print system.

FIG. 10 is a diagram showing a print operating procedure of the print system. First, the user operates the IA 105 and designates data such as contents or the like to be displayed to the IA 105 (S1001).

The IA 105 sends position information (hereinafter, simply referred to as "URL") such as a URL or the like of the designated data to the server 101 via the Internet 103 (S1002). Display data described by the HTML or the like in accordance with the http protocol is obtained (S1003). The obtained display data is displayed (S1004).

After that, the user instructs the printing from the IA 105 (S1005). Thus, the IA 105 designates the URL of the displayed data by the printer communicator 110 and issues a print request to the printer 108 (S1006).

The printer 108 which received the print request is connected to the server 101 in accordance with the http protocol and notifies the server 101 of the URL of the display data received from the IA 105, the print request, and a printer ID code (S1007).

The server 101 which received the notification stores the received print requests (obtaining requests) into the print request memory 156 every printer ID code and sequentially hands them to the PML converter 109 in order of the stored print requests (S1008). The PML converter 109 obtains the display data on the basis of the URL of the display data, extracts the URL of the printing data in the display data, and obtains the printing data from the URL of the printing data. Further, if a format of the obtained printing data is not the PML format suitable for the printing and communication, the printing data is converted into the PML data by the PML converter 109 (S1009). The PML data is sent to the printer 108 on the requesting source side (S1010). If the format of the obtained printing data is the PML format suitable for the printing and communication, the printing data is sent as it is.

The printer 108 which received the PML data interprets the PML data by the PML print unit 113, converts it into the print data, and prints it (S1011). While the printer 108 is printing, the server 101 sequentially processes the print requests stored in the print request memory 156. After the end of the printing, the server 101 sends the PML data according to the next print request to the printer 108. After completion of the whole printing operation, the printer 108 notifies the IA 105 of the end of the printing (S1012).

Figure 11:
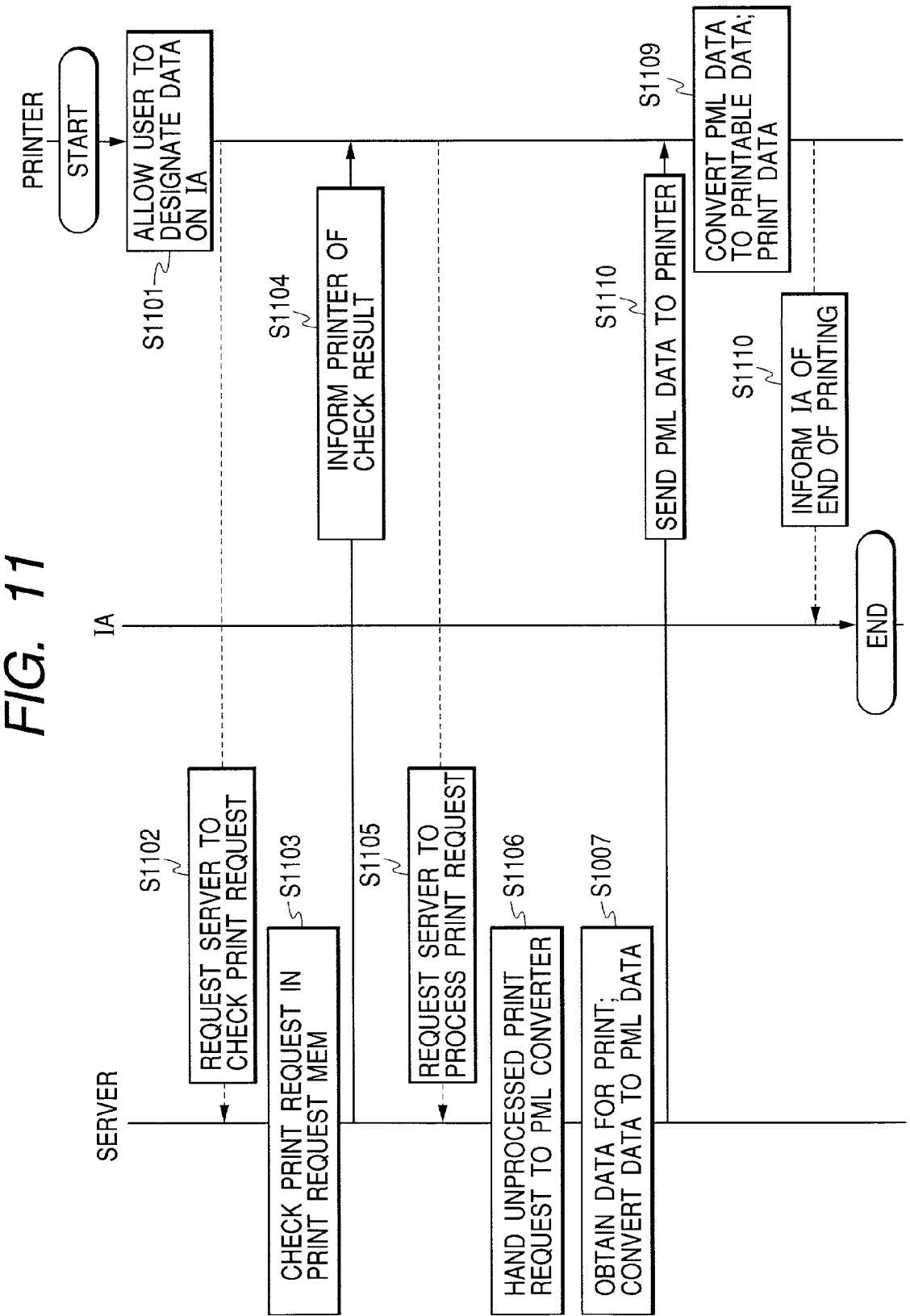
FIG. 11 is a diagram showing a print operating procedure of the print system in the case where although there are print requests in the print request memory 156, data cannot be sent to the printer 108, an apparatus is connected to a printer 108, and the print request is again issued thereto.

FIG. 11 is a diagram showing a print operating procedure of the print system in the case where although there are print requests in the print request memory 156, data cannot be sent to the printer 108, the apparatus is connected to the printer 108, and the print request is again issued thereto.

The printer 108 inquires the server 101 about whether the print request exists or not together with the printer ID code (S1101, S1102). In response to the inquiry, the server 101 discriminates whether the print requests from the printers remain in the print request memory 156 or not on the basis of the printer ID code (S1103) and notifies the printer 108 of its discrimination result (S1104).

If it is determined from the reception result that the print requests still remain, the printer 108 sends a processing request for the remaining print requests to the server 101 (S1105). The server 101 which received the processing request hands the print requests stored in the print request memory 156 to the PML converter 109 (S1106). The handed print requests can be also deleted from the print request memory 156.

The PML converter 109 executes a process similar to that in S1009 mentioned above and sends the converted PML data to the printer 108 (S1110). The printer 108 receives the PML data, converts the received PML data into the print data that is peculiar to the printer, and prints it (S1109). After the end of the printing, the printer 108 notifies the IA 105 of the end of the printing (S1110).

As mentioned above, according to the second embodiment, even if the user continuously issues the print instructions, the data can be printed at a high speed without a waste. Even if the network is disconnected, the printing can be performed without repeating the same procedure.

Seventh Embodiment

Figure 12:
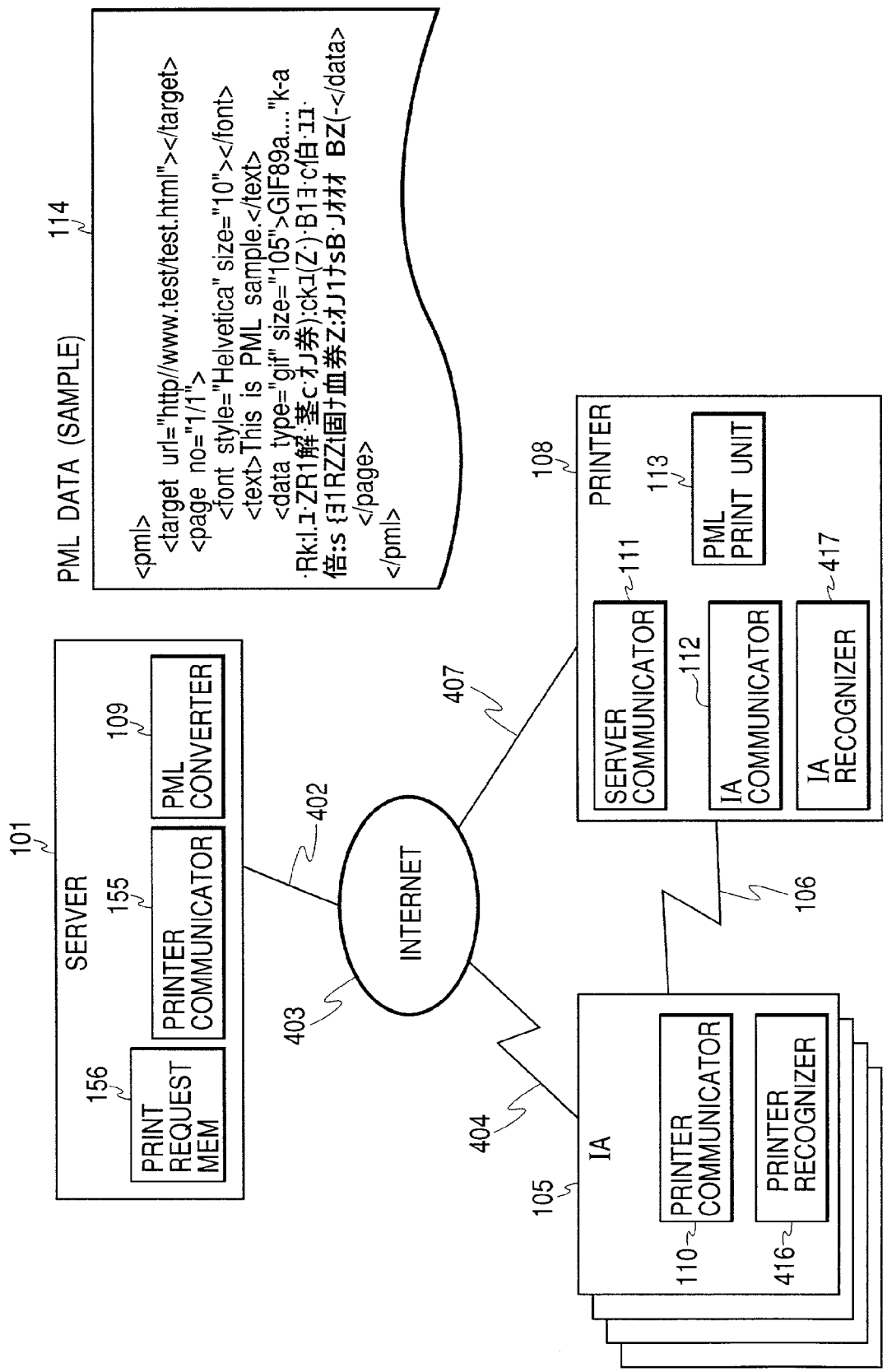
FIG. 12 is a diagram showing a construction of a print system provided with a plurality of IAs according to the seventh embodiment.
Figure 13:
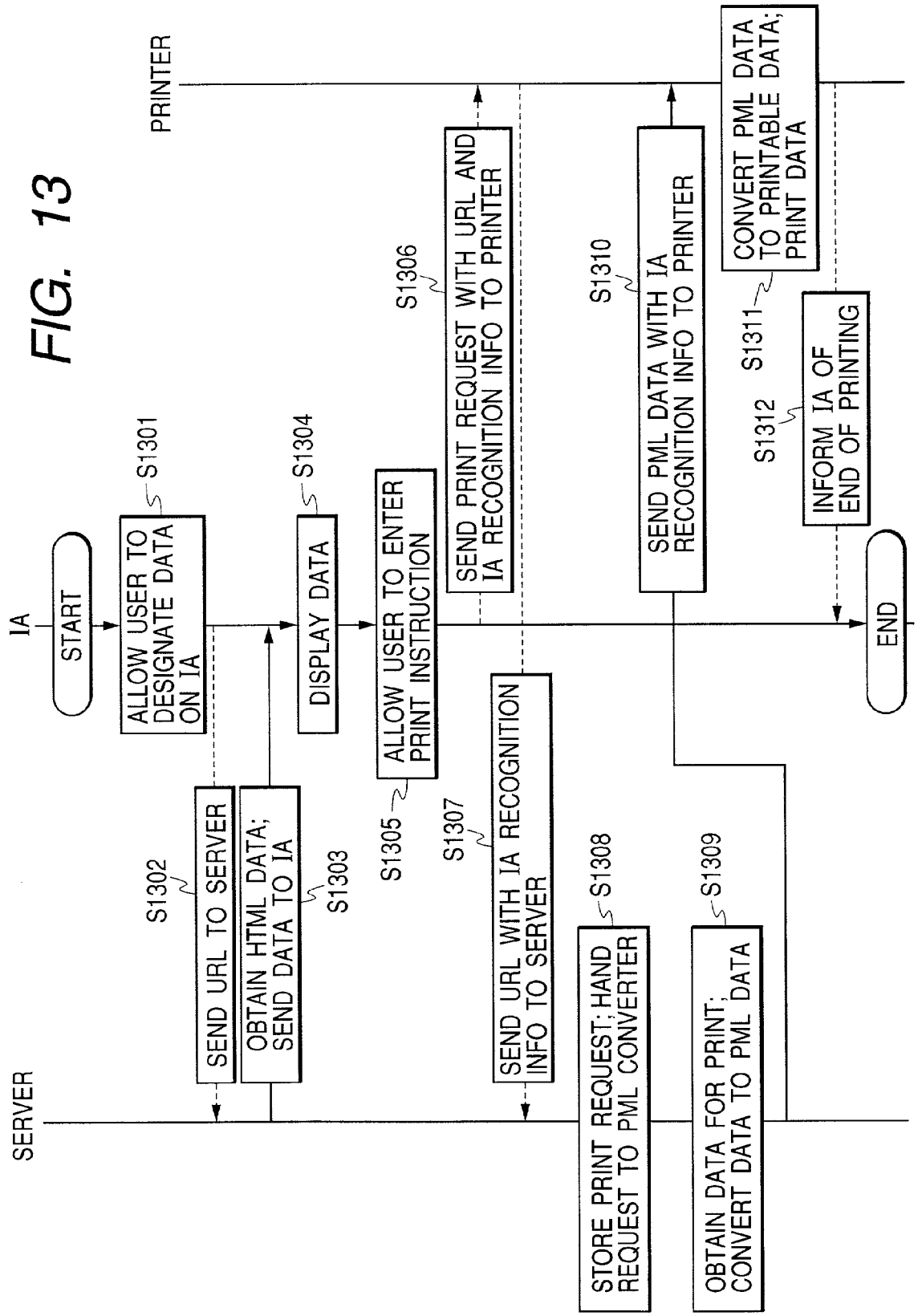
FIG. 13 is a diagram showing the operation of the print system corresponding to FIG. 10.

Although the print system in which one IA is provided has been shown in the sixth embodiment, the seventh embodiment shows a print system in which a plurality of IAs are provided. FIG. 12 is a diagram showing a construction of the print system in which a plurality of IAs are provided according to the seventh embodiment. FIG. 13 is a diagram showing the operation of the print system corresponding to FIG. 10. The same component elements and processes as those in the sixth embodiment are designated by the same reference numerals and their descriptions are omitted. Only the different portions are shown and described here.

In the print system, each IA 105 has a printer recognizer 416 and the printer 108 has an IA recognizer 417.

The operations in steps S1301 to S1305 are substantially the same as those in steps S201 to S205 in FIG. 2. When the user instructs the printing from the IA 105 (S1305), the IA 105 designates the URL of the displayed data by the printer communicator 110, issues the print request to the printer 108, and sends an IA ID code (IA recognition information) (S1306).

The printer 108 which received the print request is connected to the server 101 in accordance with the http protocol and notifies the server 101 of the URL of the display data received from the IA 105, the print request, the printer ID code, and the IA ID code (S1307).

The server 101 which received the notification stores the received print requests into the print request memory 156 every printer ID code and IA ID code and hands them to the PML converter 109 in order of the stored print requests (S1308). The PML converter 109 obtains the display data on the basis of the URL of the display data, extracts the URL of the printing data in the display data, and obtains the printing data from the URL of the printing data. Further, if a format of the obtained printing data is not the PML format suitable for the printing and communication, the printing data is converted into the PML data by the PML converter 109 (S1309). The IA ID code is added to the PML data and the data is sent to the printer 108 on the requesting source side (S1310). The operations in steps S1311 and S1312 are substantially the same as those in steps S210 to S211 in FIG. 2.

As mentioned above, when there are a plurality of IAs 105, the ID code of each IA is sent from the printer 108 to the server 101 together with the print request, and the server 101 manages the print requests stored in the print request memory 156 every printer ID code and IA ID code.

Eighth Embodiment

Figure 14:
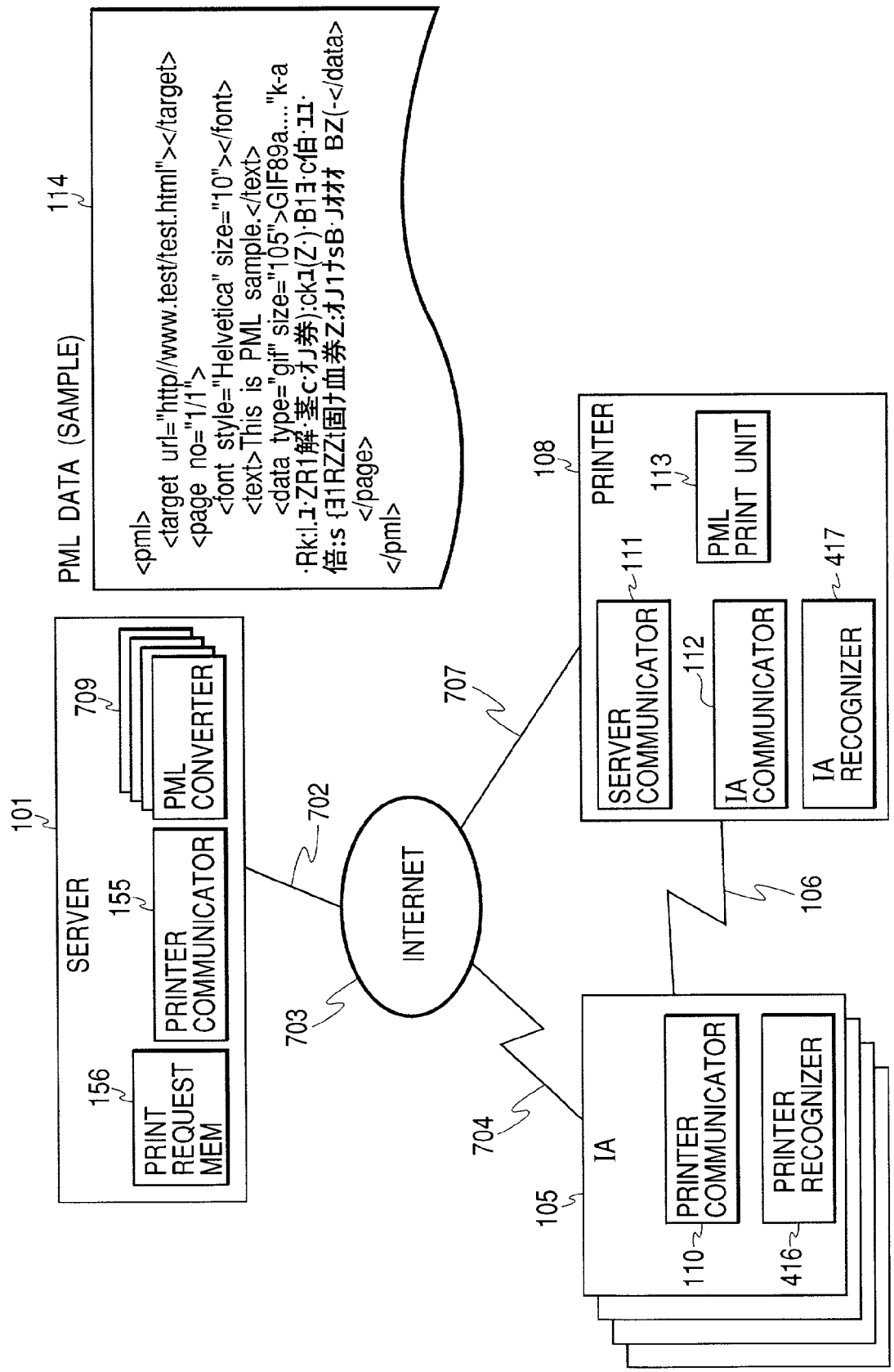
FIG. 14 is a diagram showing a construction of a print system in the case where a plurality of PML converters are provided for a server.

Although the case where one PML converter is provided for the server has been shown in the fifth, sixth, and seventh embodiments, a case where a plurality of PML converters are provided for the server is shown in the eighth embodiment. FIG. 14 is a diagram showing a construction of a print system in the case where a plurality of PML converters are provided for the server. The same component elements as those in the sixth and seventh embodiments are designated by the same reference numerals and their descriptions are omitted here.

If the server 101 has a plurality of PML converters 709, the print request memory 156 hands the print requests to the PML converters 709 which are not executing the converting operation, thereby making it possible to solve a problem that the print requests in a conversion waiting state remain in the print request memory 156. A print processing speed can be raised.

Although the print system in which the apparatuses are connected through the Internet has been shown in the embodiments, they can be also connected by the Intranet or another network in place of the Internet.

As print requests which are stored in the print request memory, print requests of the printers of different printer ID codes can be also stored. Further, if the network addresses of the printers are different, for example, like a case where they are connected to the Internet by dial-up, even when the network addresses of the printers are uniquely set at the time of the dial-up connection, since the print requests are managed by the ID information (printer ID codes) peculiar to the printers, they can be stored.

Although the PML converter has been provided for the server which holds the contents information as a print target in the embodiments, the PML converter can be also provided for another server different from the server which holds the contents information. In this case, the converted PML data is transferred to the printer by the server. The PML data converter can be also provided for the printer. In this case, after the print data is converted into the PML data, the printer further forms data peculiar to the printer and prints it.

The server can also have a printing data generating unit for generating the data peculiar to the printer from the PML data converted by the PML converter. In this case, by generating the data peculiar to the printer and sending it to the printer, the processes on the printer side can be reduced.

Further, although only the terminal apparatus has obtained the position information of the contents information as a print target, either the server or printer can also obtain it without limiting to the terminal apparatus.

A plurality of Intranets such as an LAN and the like besides the Internet can also exist on the network to which the server, IA, and printer are connected. The IA and the printer can be also connected by local communication, and they can be connected by radio communication, infrared ray communication, cables, or the like.

According to the invention, in the case where the user designates the contents information obtained by the terminal apparatus and prints by the printer through the server, the print requests can be successively accepted and the printing can be performed irrespective of the state of the printer. Before the printer starts the printing, the print instruction can be also cancelled.

Therefore, the user can print the data without considering the state of the printer and use efficiency can be raised.

Even if the user continuously issues the print instructions, the data can be printed at a high speed without a waste. Even if the network is disconnected, the printing can be executed without repeating the same procedure. Further, the communication having durability against errors which can occur in the printer can be assured.

Ninth Embodiment

The ninth embodiment will now be described. Since a construction of a print system in this embodiment is similar to that in FIG. 1, its description is omitted here.

Figure 15:
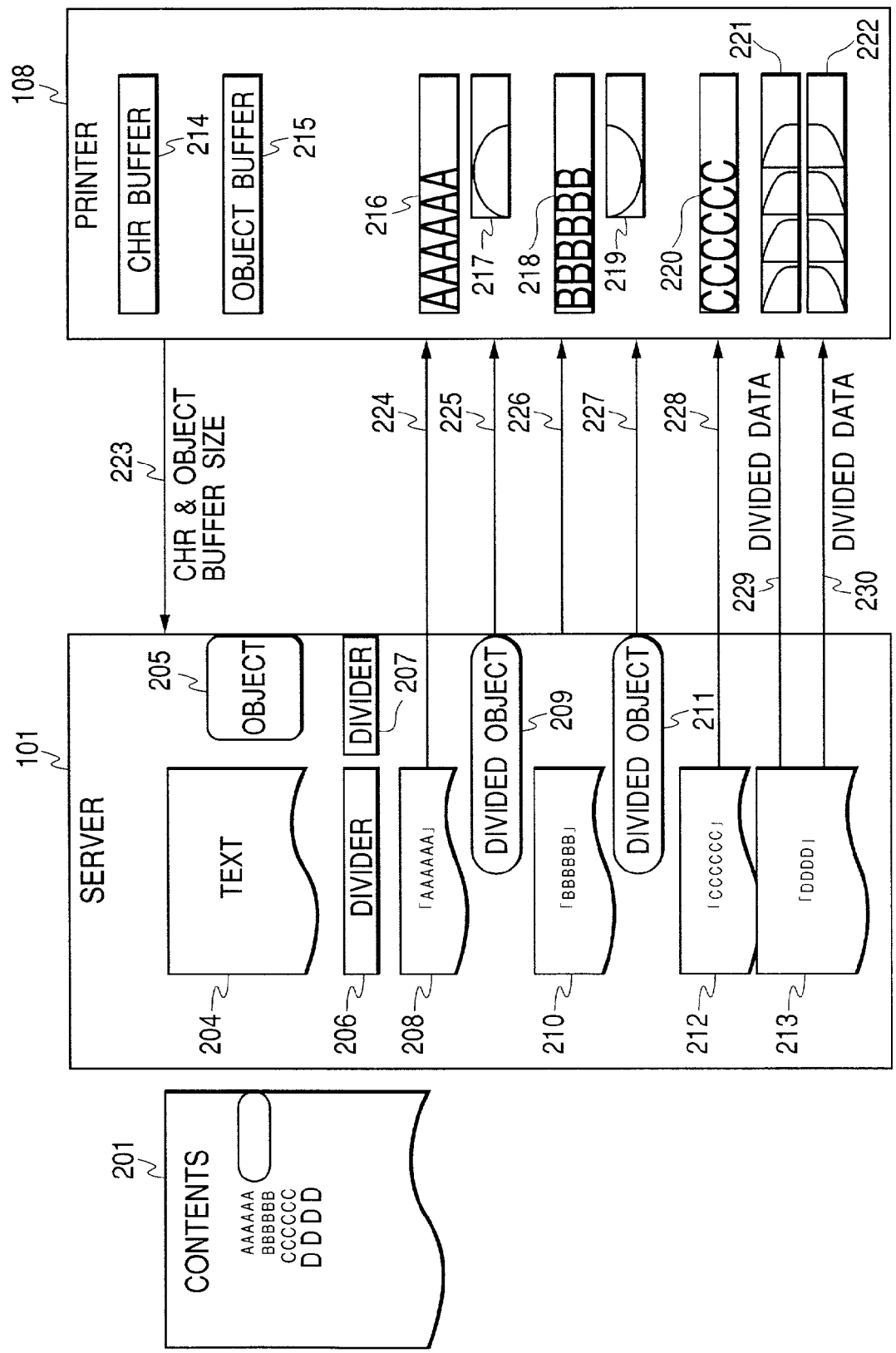
FIG. 15 is a diagram showing the operation of the print system.

FIG. 15 is a diagram showing the operation of the print system. When a request is received from the printer 108, the server 101 receives a reception buffer size (CHR & object buffer size) 223 of the printer 108 at the same time. The server 101 has a text 204 obtained by PML converting contents 201 and an object 205 included in the contents 201.

The CHR & object buffer size 223 received from the printer 108 comprises a size of reception character buffer (CHR buffer) 214 of the printer 108 and a size of reception object buffer 215.

The server 101 divides the text 204 of the contents 201, that is, a portion comprising character data by a divider 206. That is, when the size of CHR buffer 214 is equal to (n characters)×(m lines), the contents are divided on a unit basis of (n characters)×(m lines). Similarly, the object is also divided in accordance with the size of reception object buffer 215. As mentioned above, the divided data can be sent as if it were one contents.

In case of printing, if characters whose capacity is larger than that of the CHR buffer 214 have to be sent, the number of lines over which the data portion rides in the actual printing is calculated and the data is sent as divided data the number of times obtained by dividing the calculated number of lines by m (lines).

Although the printer 108 receives the same data, divided data 229 and 230 of the same data is included in the sent data.

Specifically speaking, character groups "AAAAAA", "BBBBBB", and "CCCCCC" and a character group "DDDD" larger than those character groups are included in the contents 201 in FIG. 15 and, further, an object of an ellipse is included.

A character group 208 of "AAAAAA" is transferred as transmission data 224 and developed as data 216 into the CHR buffer 214. A character group 210 of "BBBBBB" is transferred as transmission data 226 and developed as data 218 into the CHR buffer 214. A character group 212 of "CCCCCC" is transferred as transmission data 228 and developed as data 220 into the CHR buffer 214.

A large character group 213 of "DDDD" is transferred as divided data 229 and 230 and developed as data 221 and 222 into the CHR buffer 214.

By sending the data as mentioned above, it can be divided on a character unit basis without executing complicated processes like a driver installed in the PC.

The object of the ellipse is also divided by a divider 207. Divided objects 209 and 211 are transferred as divided data 225 and 227 and developed as divided data 217 and 219 into the reception object buffer 215. Since the object can be also divided and transferred as mentioned above, the reception buffer of the minimum capacity can be used as a buffer on the printer side.

Figure 16:
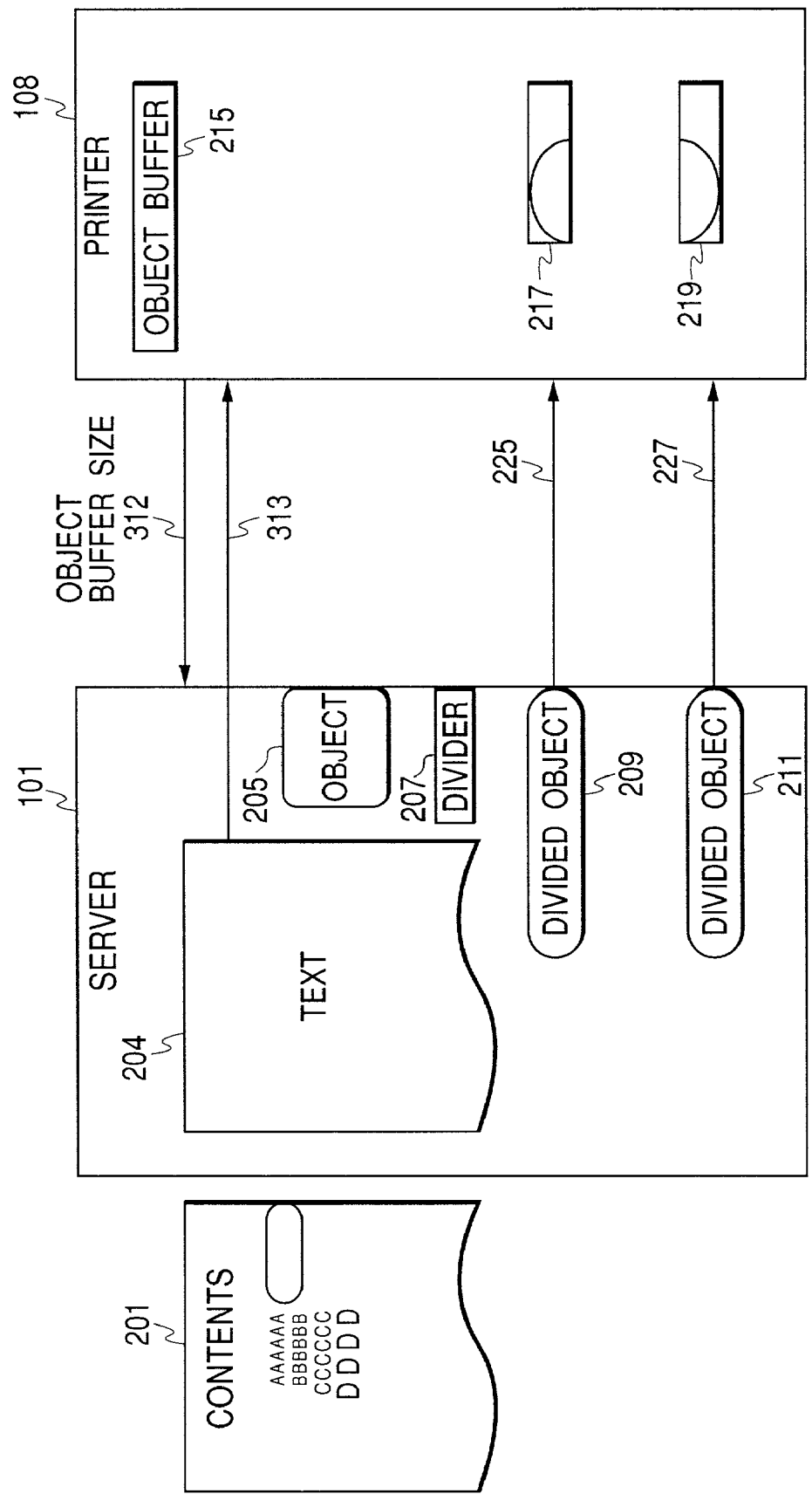
FIG. 16 is a diagram showing the operation of the print system in the case where a text is transferred in a lump and only an object is divided and transferred.

Although the server has divided both of the text and the object and transferred the divided data to the printer in the embodiment, it is also possible to transfer the text in a lump and divide only the object and transfer the divided object portions. FIG. 16 is a diagram showing the operation of a print system in the case where a text is transferred in a lump and only the object is divided and transferred. The same portions as those in the ninth embodiment are designated by the same reference numerals.

When a request is received, the server 101 receives the size of reception object buffer 215.

The text of the contents 201, specifically speaking, the character groups "AAAAAA", "BBBBBB", and "CCCCCC" and the character group "DDDD" larger than those character groups are transferred as data 313 in a lump to the printer 108.

On the other hand, the object 205 of the ellipse is divided into two divided objects 209 and 211, and they are transferred as divided data 225 and 227 and developed as divided data 217 and 219 into the reception object buffer 215, respectively.

Figure 17:
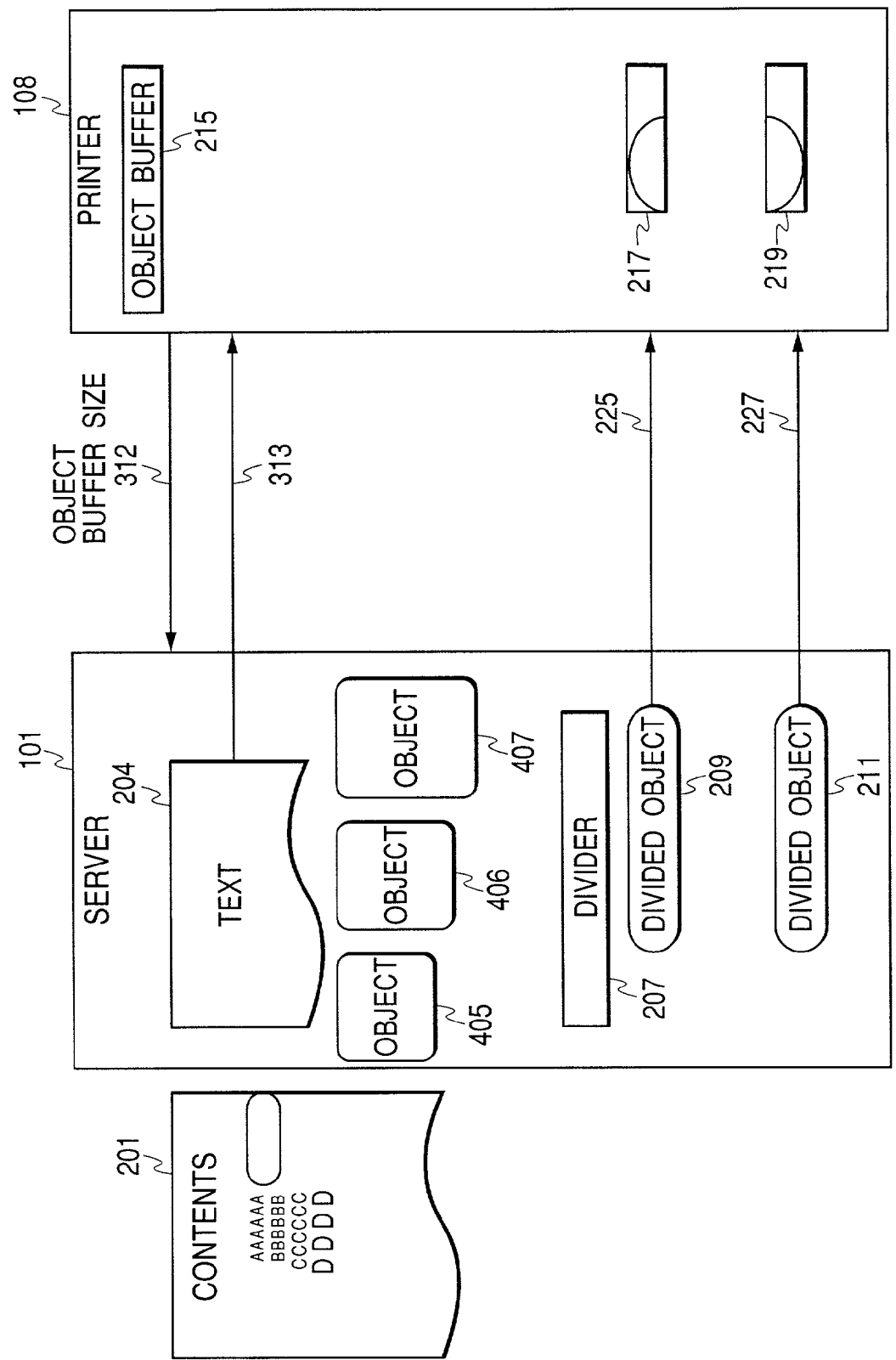
FIG. 17 is a diagram showing the operation of the print system in the case where an object has a plurality of object data corresponding to resolutions of printers.

FIG. 17 is a diagram showing the operation of the print system in the case where an object has a plurality of object data corresponding to resolutions of printers. If the object has a plurality of object data corresponding to the resolutions of the printers, when the request is received, the server 101 receives the resolution of the printer 108 and the size of reception object buffer 215 at the same time.

The server 101 selects the object data suitable for the resolution of the printer 108 among a plurality of object data 405, 406, and 407 of different resolutions. The selected object data is divided by the divider 207 in accordance with the size of reception object buffer 215, thereby generating the divided objects 209 and 211. The divided objects 209 and 211 are transferred as data 225 and 227 to the printer 108 and developed as data 217 and 219 into the reception object buffer 215.

If the object is a compressed image of a JPEG or the like and cannot be divided as it is, the server once decompresses it and divides the decompressed image. The divided decompressed image is compressed again to the JPEG or the like every divided object and sent. At this time, the data of the divided objects can be also sent as they are without compressing them again.

Although the embodiments of the invention have been described above, the invention is not limited to the constructions of those embodiments but can be also applied to any construction such that the functions shown in the scope of claims of the invention or the functions which the constructions of the embodiments have can be accomplished.

For example, although the print systems in which the apparatuses are connected through the Internet have been shown in the embodiments, they can be also connected by the Intranet or another network in place of the Internet.

Although the PML converter has been provided for the server which holds the contents information as a print target in the above embodiments, the PML converter can be also provided for another server different from the server which holds the contents information. In this case, the PML data converted by the server is transferred to the printer. The PML data converter can be also provided for the printer. In this case, the printer converts the print data into the PML data and, thereafter, further generates the data peculiar to the printer, and prints it.

The server also has a printing data generating unit for generating the data peculiar to the printer from the PML data converted by the PML converter. In this case, by generating the data peculiar to the printer and sending it to the printer, the processes on the printer side can be reduced.

Further, although only the terminal apparatus obtains the position information of the contents information as a print target, either the server or the printer can also obtain it without limiting to the terminal apparatus.

As a network to which the server, IA, and printer are connected, a plurality of Intranets such as LAN and the like besides the Internet can be also used. It is sufficient that the IA and the printer are connected by local communication. They can be also connected by radio communication, infrared ray communication, a cable, or the like.

According to the invention, when the user designates the contents information which is obtained at the terminal apparatus and prints it by the printer through the server, the burden on the server side and the burden on the communication on the user side can be reduced.

What is claimed is:

1. A printing method in a print system having an information appliance for instructing printing, a printer for issuing a print request in response to the print instruction from said information appliance, and a server for transferring print data to said printer in accordance with the print request from said printer, wherein said printing method comprises:
    a discriminating step discriminating whether said printer can be connected to said server or not; and
    a step of issuing said print request to said information appliance if it is determined by said discriminating step that said printer cannot be connected.

2. A print system comprising:
    an information appliance for instructing printing;
    a printer for issuing a print request in response to said print instruction from said information appliance;
    a server for transferring print data to said printer in accordance with the print request form said printer; and
    discriminating means for discriminating whether said printer can be connected to said server or not,
    wherein when it is determined by said discriminating means that said printer cannot be connected, said printer issues said printer request to said information appliance.

* * * * *

UNITED STATES PATENT AND TRADEMARK OFFICE
CERTIFICATE OF CORRECTION

| | | |
|---|---|---|
| PATENT NO. | : 6,970,263 B2 | Page 1 of 1 |
| APPLICATION NO. | : 09/893647 | |
| DATED | : November 29, 2005 | |
| INVENTOR(S) | : Suzuki et al. | |

It is certified that error appears in the above-identified patent and that said Letters Patent is hereby corrected as shown below:

COLUMN 18:
Line 56, "form" should read -- from --; and
Line 61, "printer request" should read -- print request --.

Signed and Sealed this

Eighth Day of August, 2006

JON W. DUDAS
*Director of the United States Patent and Trademark Office*